United States Patent
Yamaguchi et al.

(10) Patent No.: US 7,960,669 B2
(45) Date of Patent: Jun. 14, 2011

(54) HYBRID THERMAL CUTTING APPARATUS

(75) Inventors: Yoshihiro Yamaguchi, Komatsu (JP); Tetsuya Kabata, Komatsu (JP); Ikuo Kamada, Komatsu (JP)

(73) Assignee: Komatsu Industries Corporation, Komatsu-shi (JP)

( * ) Notice: Subject to any disclaimer, the term of this patent is extended or adjusted under 35 U.S.C. 154(b) by 1210 days.

(21) Appl. No.: 11/630,141

(22) PCT Filed: Jun. 20, 2005

(86) PCT No.: PCT/JP2005/011239
§ 371 (c)(1),
(2), (4) Date: Dec. 20, 2006

(87) PCT Pub. No.: WO2006/001242
PCT Pub. Date: Jan. 5, 2006

(65) Prior Publication Data
US 2007/0241083 A1      Oct. 18, 2007

(30) Foreign Application Priority Data
Jun. 25, 2004   (JP) ................................. 2004-187367

(51) Int. Cl.
*B23K 10/00* (2006.01)
*B23K 26/00* (2006.01)
(52) U.S. Cl. .......... 219/121.39; 219/121.48; 219/121.67
(58) Field of Classification Search ............... 219/121.7, 219/121.67, 121.39, 121.44, 121.45, 121.46, 219/121.48, 121.58
See application file for complete search history.

(56) References Cited

U.S. PATENT DOCUMENTS
4,940,879 A * 7/1990 De-Swaan ............... 219/121.67
5,350,897 A    9/1994 Chun
5,635,086 A    6/1997 Warren, Jr. et al.

FOREIGN PATENT DOCUMENTS
JP     9-108875 A    4/1997
JP    2001-25873 A   1/2001

OTHER PUBLICATIONS
International Search Report of PCT/JP2005/011239, date of mailing Oct. 18, 2005.

* cited by examiner

*Primary Examiner* — Mark H Paschall
(74) *Attorney, Agent, or Firm* — Westerman, Hattori, Daniels & Adrian, LLP

(57) ABSTRACT

A hybrid thermal cutting apparatus has both a laser head and a plasma torch, both of which can be controlled independently, can perform both laser processing and plasma processing, thus reducing the running costs. A large number of cutting lines for cutting out various types of manufactured products from plate materials are classified into a laser cutting type and a plasma cutting type, according to the cutting length, whether they are the external periphery of manufactured products or apertures, the size of the manufactured products or the apertures, the required process accuracy, the plate thickness, or the like. The lines of the laser cutting type are cut by laser processing, while the lines of the plasma cutting type are cut by plasma processing.

6 Claims, 24 Drawing Sheets

FIG. 22
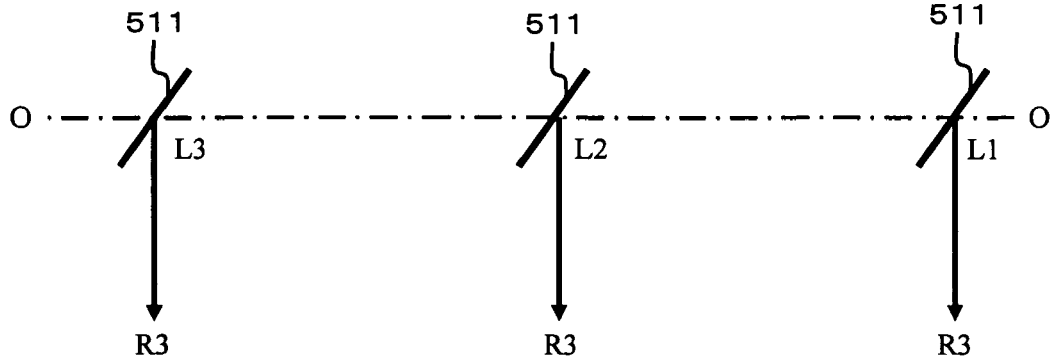
(A) WHEN MIRROR POSITION HAS NOT CHANGED
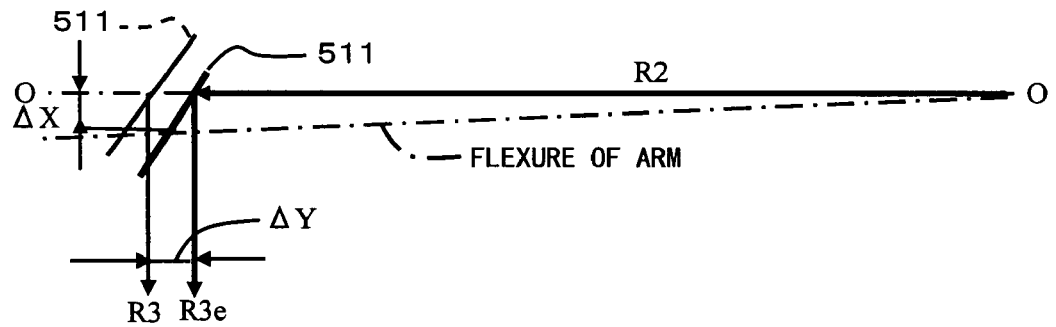
(B) WHEN MIRROR POSITION HAS CHANGED
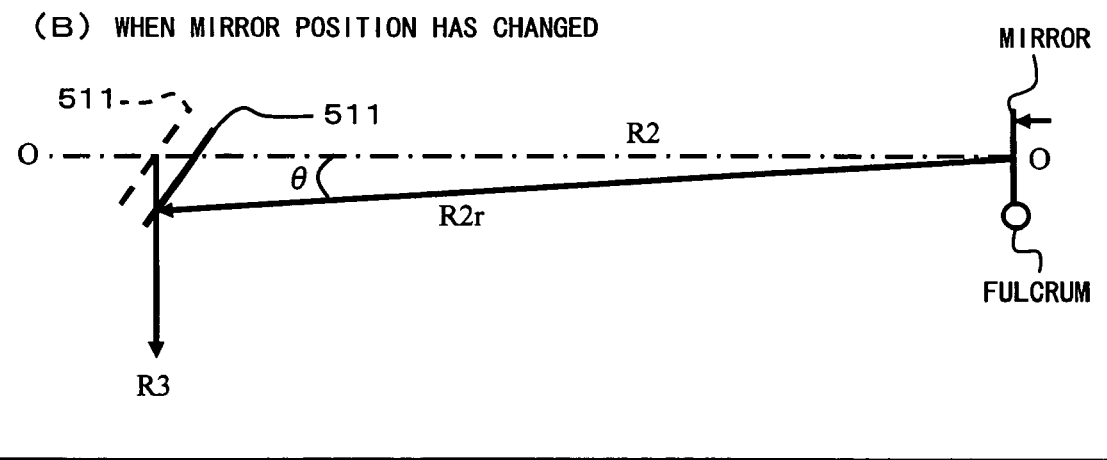
(B) WHEN MIRROR POSITION HAS CHANGED

HYBRID THERMAL CUTTING APPARATUS

TECHNICAL FIELD

The present invention relates to a hybrid thermal cutting apparatus which has thermal cutting heads of two types, laser and plasma, and to a hybrid thermal cutting method.

BACKGROUND OF THE INVENTION

In U.S. Pat. No. 5,350,897, there is disclosed an apparatus in which two thermal cutting heads, plasma and laser, are installed in line to a turret punch press. Either the plasma cutting head or the laser cutting head can be chosen and brought to a cutting position.

In Japanese Laid Open Patent Publication Heisei 9-108875, there is disclosed an apparatus in which, to a single gantry which can traverse a table and shift in the vertical direction, there are mounted one or two carriages which are shiftable in the horizontal direction, and two thermal cutting heads, plasma and laser, are installed in line to each of these carriages. On each carriage, either one of the plasma cutting head and the laser cutting head may be selected and used. If two carriages mounted to a single gantry are used, then it is possible simultaneously to perform cutting of two patterns which are the same, or of two patterns which are in mirror image relationship.

And, in Japanese Laid Open Patent Publication 2001-25873, there is disclosed an apparatus in which, to a single X axis mobile unit (gantry) which can traverse over a table and shift in the vertical direction, there is mounted a single process head (carriage) which can shift in the horizontal direction, and a plasma torch and a laser head are installed in line upon this process head. The laser head and the plasma torch are both used as appropriate, in a piercing process or a cutting process. For example, the piercing process may be performed by the laser head, while the cutting process may be performed by the plasma torch.

SUMMARY

Generally, with a thermal cutting apparatus, reduction of the running cost (for example, the cost of electrical power consumption for generating a laser beam, or the cost due to ablation or the like of the electrode of a plasma torch) is an extremely important problem. However, no particular technique is disclosed in the above described patent documents for reducing the running cost.

Furthermore although, when thermal cutting heads of two types, laser and plasma, are mounted, it is considered that the heads exert a mutual influence upon one another, in the above documents, insufficient consideration is accorded to the mutual influence exerted by the two different types of thermal cutting head upon one another. For example, although it is considered that the process performed by one of the thermal cutting heads exerts an influence from the points of view of accuracy and durability upon the process performed by the other thermal cutting head, in the prior art techniques, no adequate countermeasures have been implemented with regard to this mutual relationship.

Accordingly, the object of the present invention is, in a hybrid thermal cutting apparatus which is equipped with both laser and plasma thermal cutting heads, to reduce the running cost. Another objective of the present invention is, in a hybrid thermal cutting apparatus which is equipped with different thermal cutting heads, laser and plasma, to be able to reduce the influence which one of the thermal cutting heads exerts upon the other.

According to the present invention, a hybrid thermal cutting apparatus which includes a plasma torch which generates a plasma arc and a laser head which generates a laser beam, also includes: a table for supporting a plate material; a shift mechanism which shifts said plasma torch and said laser head within a working space over said table; and a controller which controls said plasma torch, said laser head and said shift mechanism so that said plate material upon said table is cut along predetermined cutting lines. And said controller includes: a supervisory control device having processing command information which defines said cutting lines, and which moreover classifies said cutting lines into a plasma cutting type or a laser cutting type, according to processing conditions which include the geometric characteristics of said cutting lines, or the processing accuracy, or the characteristics of said plate material; a plasma control device which controls said plasma torch based upon said processing command information, and performs cutting along said cutting lines of plasma cutting type; and a laser control device which controls said laser head based upon said processing command information, and performs cutting along said cutting lines of laser cutting type.

According to this hybrid cutting apparatus, when cutting a plate material along one cutting line or more, the work is divided between the plasma torch and the laser head according to the cutting conditions, like the geometric characteristics of the cutting lines, the process accuracy, the characteristics of the plate material, or the like. By doing this, it becomes possible to perform cutting with the plasma torch of those cutting lines which satisfy the condition that, from the point of view of cost, they can be more profitably cut with the plasma torch, while those cutting lines which satisfy the condition that they can be more profitably cut with the laser head are cut with the laser head; and accordingly it is possible to reduce the running cost of performing the cutting.

As methods for classifying said cutting lines into the plasma cutting type and the laser cutting type, there may be employed singly or in combination:

(1) a method of classifying the cutting lines according to the continuous length of said cutting lines, for example classifying cutting lines which are longer than a predetermined reference length as being of the plasma cutting type, and classifying cutting lines which are shorter as being of the laser cutting type;

(2) a method of classifying the cutting lines according to whether they correspond to the external peripheries of manufactured products, or to apertures, for example classifying cutting lines which correspond to external peripheries as being of the plasma cutting type, and classifying cutting lines which correspond to apertures as being of the laser cutting type;

(3) a method of classifying the cutting lines according to the thickness of the plate material, for example classifying them as being of the plasma cutting type if the plate material is thicker than a predetermined reference value, and classifying them as being of the laser cutting type if it is thinner;

(4) a method of classifying the cutting lines according to the processing accuracy, for example classifying them as being of the plasma cutting type if the processing accuracy is lower than a predetermined reference value, and classifying them as being of the laser cutting type if it is higher;

(5) a method of classifying the cutting lines according to the number of apertures in the manufactured products, for example classifying the cutting lines for a manufactured product which has fewer apertures than a predetermined reference number as being of the plasma cutting type, and classifying the cutting lines for a manufactured product which has more apertures than the predetermined reference number as being of the laser cutting type;

(6) a method of classifying the cutting lines according to the size (i.e. the diameter) of the manufactured products or of the apertures, for example classifying cutting lines for manufactured products or apertures whose size is greater than a predetermined reference value as being of the plasma cutting type, and classifying cutting lines for manufactured products or apertures whose size is smaller than the predetermined reference value as being of the laser cutting type; or the like.

According to another aspect of the present invention, a hybrid thermal cutting apparatus, which includes a plasma torch which generates a plasma arc and a laser head which generates a laser beam, also includes: a table for supporting a plate material; a shift mechanism which shifts said plasma torch and said laser head within a working space over said table; and a control device which performs control of said plasma torch, said laser head and said shift mechanism so that said plate material upon said table is cut along cutting lines. And said shift mechanism includes a plasma torch shift mechanism which shifts said plasma torch, and a laser head shift mechanism which shifts said laser head, while said controller includes a plasma control device which independently controls said plasma torch shift mechanism, and a laser control device which independently controls said laser head shift mechanism.

According to this hybrid cutting apparatus, it is possible to perform plasma cutting and laser cutting at the same time in parallel, while shifting the plasma torch and the laser head to mutually different positions in mutually independent directions through mutually independent displacement amounts. Due to this, it becomes possible to perform cutting with the plasma torch of those cutting lines which satisfy the condition that, from the point of view of cost, they can be more profitably cut with the plasma torch, while those cutting lines which satisfy the condition that they can be more profitably cut with the laser head are cut with the laser head; and accordingly it is possible to reduce the running costs of performing the cutting.

In a preferred embodiment, each of said plasma torch shift mechanism and said laser head shift mechanism has a parking location which is positioned outside of said working space. According to this structure, by parking one of the laser head shift mechanism or the plasma torch shift mechanism in its parking location while freely shifting the other, it is also possible to perform only plasma cutting, or only laser cutting, over the entirety of the working space.

According to yet another aspect of the present invention, a hybrid thermal cutting method which cuts a plate material along cutting lines using a plasma torch and a laser head includes: a step of defining said cutting lines; a step of classifying said cutting lines into a plasma cutting type or a laser cutting type, according to processing conditions which include the geometric characteristics of said cutting lines, or the processing accuracy, or the characteristics of said plate material; and a step of cutting the lines of said plasma cutting type using said plasma torch, and cutting the lines of said laser cutting type using said laser beam.

According to still another aspect of the present invention, a computer program causes a computer to create processing programs for controlling a hybrid thermal cutting apparatus to cut a plate material along cutting lines using a plasma torch and a laser head. The computer program causes a compute to execute: a step of classifying said cutting lines into a plasma cutting type or a laser cutting type, according to processing conditions which include the geometric characteristics of said cutting lines, or the processing accuracy, or the characteristics of said plate material; a step of creating a plasma processing program which commands said hybrid thermal cutting apparatus to cut said cutting lines of plasma cutting type using said plasma torch; and a step of creating a laser processing program which commands said hybrid thermal cutting apparatus to cut said cutting lines of laser cutting type using said laser head.

According to yet another aspect of the present invention, a hybrid thermal cutting apparatus which includes a plasma torch which generates a plasma arc and a laser head which generates a laser beam, also includes: a table for supporting a plate material; a plasma torch shift mechanism which shifts said plasma torch over said table; a laser head shift mechanism which shifts said laser head over said table; and a controller which controls said plasma torch, said laser head, said plasma torch shift mechanism, and said laser head shift mechanism so that said plate material upon said table is cut along predetermined cutting lines.

In a preferred embodiment, said controller controls said plasma torch shift mechanism and said laser head shift mechanism and shifts said plasma torch and said laser head independently, and performs cutting of said plate material along some cutting lines by controlling said plasma torch, and moreover performs cutting of said plate material along other cutting lines by controlling said laser head.

According to another aspect of the present invention, a hybrid thermal cutting apparatus which is capable of performing both plasma processing and laser processing includes: a table for supporting a plate material; a support unit, provided in the neighborhood of one side of said table, which can shift along said table; an arm which has a base end portion supported by said support unit and which straddles said table, extending from one side of a working space defined over said table to the other side thereof; a laser head which is positioned towards the base end portion of said arm, and which is provided so as to be shiftable along said arm; a plasma torch which is positioned towards a toe end portion of said arm, and which is provided so as to be shiftable along said arm; a laser beam supply unit which is provided at the base end portion of said arm, and which supplies a laser beam to said laser head via an optical path unit which extends along said arm; and a controller which controls the operation of each of said plasma torch, said laser head, and said laser beam supply unit. And the plasma torch is provided in a position towards the toe end portion of said arm and said laser head is provided in a position towards the base end portion of said arm, both being shiftable along said arm; a plasma head parking region for parking said plasma head is provided at the toe end portion of said arm; and a laser head parking region for parking said laser head is provided at the base end portion of said arm. And the controller performs control so as to park said laser head in said laser head parking region during processing of said plate material by said plasma torch, and so as to park said plasma torch in said plasma torch parking region during processing of said plate material by said laser head.

With a hybrid thermal cutting apparatus of this structure, according to this so called cantilevered support method, it is possible to operate both the laser head and also the plasma torch individually, and it is possible to park one of these heads while operating the other. Due to this, it is possible to reduce the influence which each of the laser head and the plasma torch exerts upon its opposite head, so that it is possible to enhance the reliability.

In another preferred embodiment, there is included a shield portion for at least partially shielding between said working space and said laser head parking region. Due to this, it is possible to reduce the influence which the heat from the plasma torch exerts upon the laser head.

In another preferred embodiment, there is further included an adjuster which adjusts the optical axis of the laser beam which is supplied to said laser head from said laser beam supply unit, according to the position of said laser head. Due to this, even if for example deviation in the position of the laser head has occurred due to its own weight, it is possible to adjust the optical axis so as to cancel the influence due to this positional deviation.

In another preferred embodiment, the controller includes: a supervisory control device which has processing command information which defines said cutting lines for cutting said plate material, and which moreover classifies said cutting lines into a plasma cutting type or a laser cutting type, according to processing conditions which include the geometric characteristics of said cutting lines, or the processing accuracy, or the characteristics of said plate material; a laser control device which controls said laser head based upon said processing command information, and performs cutting along said cutting lines of laser cutting type; and a plasma control device which controls said plasma torch based upon said processing command information, and performs cutting along said cutting lines of plasma cutting type. And the laser control device causes said laser beam supply unit to transit to a wake up state while said laser processing is being performed, and causes said laser beam supply unit to transit to a sleep state while said plasma processing is being performed. Due to this, if only the laser processing is to be performed, it is possible to put the laser beam supply unit into a state in which it can be used immediately, so that it is possible to reduce the amount of electrical power consumption.

In another preferred embodiment, the controller also uses predetermined measurement data which has been measured during either said plasma processing or said laser processing, in the other one of said processes. By doing this, it is possible to avoid performing the same measurements for both of the processes, so that it is possible to shorten the time period required for changing over between the plasma process and the laser process, and it is accordingly possible to enhance the processing performance of the hybrid thermal cutting apparatus.

According to another aspect of the present invention, a hybrid thermal cutting apparatus which includes both a laser head and a plasma torch, also includes: a table for supporting a plate material; a shift mechanism for shifting each of said laser head and said plasma torch over said table; and a controller which controls the operation of each of said plasma torch and said laser head. And a plasma head parking region for parking said plasma head, and a laser head parking region for parking said laser head, are each provided outside a working space in which laser processing or plasma processing is performed; and said controller performs control so as to park said laser head in said laser head parking region when said plate material is being processed by said plasma torch, and so as to park said plasma torch in said plasma torch parking region when said plate material is being processed by said laser head.

According to still another aspect of the present invention, a hybrid thermal cutting apparatus which includes both a laser head and a plasma torch, also includes: a table for supporting a plate material; a shift mechanism for shifting each of said laser head and said plasma torch over said table; a laser beam supply unit which supplies a laser beam to said laser head; and a controller which controls the operation of said plasma torch, said laser head, and said laser beam supply unit. And the controller supplies a launch command to said laser beam supply unit while said laser processing is being performed, and supplies a halt command to said laser beam supply unit while said plasma processing is being performed.

According to another aspect of the present invention, a hybrid thermal cutting apparatus which includes both a laser head and a plasma torch, also includes: a table for supporting a plate material; a shift mechanism for shifting each of said laser head and said plasma torch over said table; a distance detector which detects the distance between said laser head and said plate material; and a controller which controls the operation of said plasma torch and said laser head. And the controller calculates distance data between said plate material and said plasma torch based upon distance data which has been measured by said distance detector during laser processing, and performs plasma processing upon said plate material based upon this distance data which has been calculated. By doing this, and by compensating the distance data which has been measured during the laser processing, it is possible to take advantage of this distance data also during the plasma processing, so that it is possible to omit any measurement of distance when performing the plasma processing.

According to yet another aspect of the present invention, a hybrid thermal cutting apparatus which includes both a laser head and a plasma torch, also includes: a table for supporting a plate material; a shift mechanism for shifting each of said laser head and said plasma torch over said table; a laser beam supply unit which supplies a laser beam to said laser head; and an adjuster which adjusts the optical axis of the light beam which is supplied to said laser head from said laser beam supply unit. And the adjuster includes: a mirror unit for reflecting said laser beam; an attitude variation unit for varying the attitude of said mirror unit in a predetermined direction; and an attitude control unit for inputting a control signal to and operating said attitude variation unit. Moreover, the attitude control unit includes: a position detection unit which detects the position of said laser head; a compensation amount storage unit which stores a compensating amount for eliminating positional deviation generated in said mirror unit according to variation in the position of said laser head; and a signal generation unit which creates and outputs a control signal for operating said attitude variation unit, by referring to said compensation amount storage unit based upon the signal detected by said position detection unit. Due to this, it is possible to prevent decrease of the process accuracy due to positional deviation of the laser head.

BRIEF DESCRIPTION OF THE DRAWINGS

FIG. 22 is a schematic figure showing the situation when adjusting the optical axis: (A) shows the emitted light beam when it is assumed that deviation of the position of the laser head has not occurred; (B) shows the emitted light beam when it is assumed that deviation of the position of the laser head has occurred; and (C) shows the case in which the optical axis of the incident light beam is adjusted so as to cancel positional deviation of the laser head;

PREFERRED EMBODIMENTS

In the following, embodiments of the present invention will be explained in detail with reference to the drawings. As will be described hereinafter, with the hybrid thermal cutting apparatus of these embodiments, it is arranged to use thermal cutting heads of a plurality of types either simultaneously or one at a time.

Embodiment 1

Figure 1:
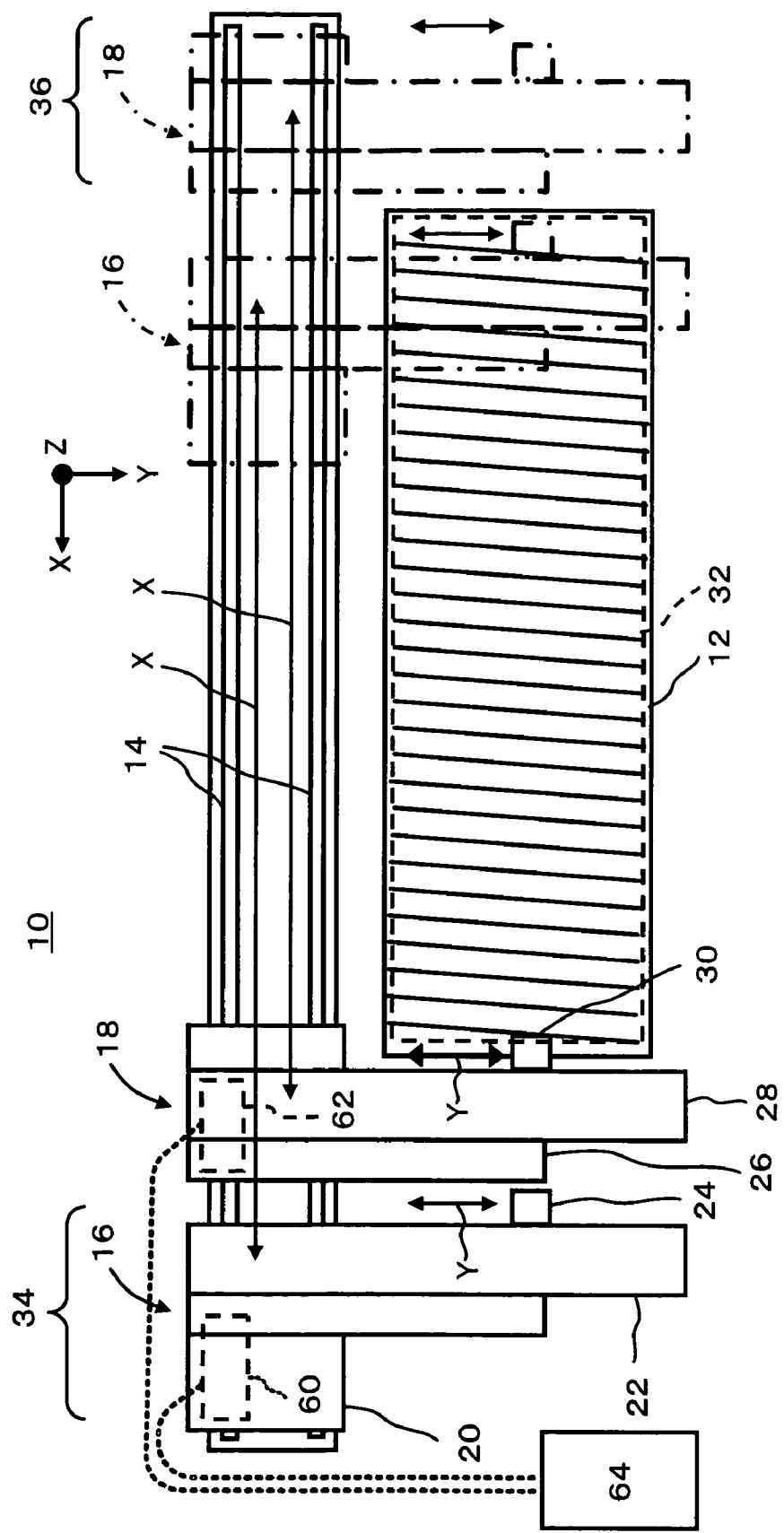
FIG. 1 is a plan view showing the overall structure of a hybrid thermal cutting apparatus according to one embodiment of the present invention.

FIG. 1 is a plan view showing the overall structure of a hybrid thermal cutting apparatus according to one embodiment of the present invention. And FIGS. 2 through 5 are perspective views of this hybrid thermal cutting apparatus, in various operational states.

As shown in FIGS. 1 through 5, this hybrid cutting apparatus 10 comprises a box shaped table 12 which is set up upon a floor. The rectangular upper surface of this table 12 is made in the form of slats, i.e. a lattice, and upon this there is mounted a plate material 44, 46, 50, or 56, which is the material to be cut. An orthogonal X-Y-Z coordinate system is defined for use during numerical calculation processing for controlling the cutting position of this plate material upon the table 12. The X axis of this orthogonal X-Y-Z coordinate system is parallel to the long side of the upper surface of the table (the horizontal direction in FIG. 1); the Y axis is parallel to the short side of the upper surface of the table 12 (the vertical direction in FIG. 1); and the Z axis is perpendicular to the upper surface of the table 12 (the direction piercing through the drawing paper in FIG. 1).

An X axis track 14 is set up on the floor in the neighborhood of the long side of the table 12, parallel to the long side of the table 12 (i.e. the X axis). Two cutting shuttles are mounted upon this X axis track 14: a laser shuttle 16 for performing laser cutting using a laser beam, and a plasma shuttle 18 for performing plasma cutting using a plasma arc. Both this laser shuttle 16 and this plasma shuttle 18 can be shifted along the X axis track 14, i.e. along the X axis direction.

The laser shuttle 16 comprises a shift trolley 20 which can run upon the X axis track 14 in the X axis direction. A Y axis track 22 in the form of an arm which extends over the table 12 in the Y axis direction is fixed upon this shift trolley 20. A carriage 24 is mounted upon this Y axis track 22, and this carriage 24 can shift along the Y axis track 22 in the Y axis direction A laser head 40 which generates a laser beam is installed to this carriage 24, facing towards the table 12 (i.e. facing downwards). And this carriage 24 can shift the laser head 40 in the Z axis direction.

Furthermore, the plasma shuttle 18 comprises a shift trolley 26 which can run upon the X axis track 14 in the X axis direction. A Y axis track 28 in the form of an arm which extends over the table 12 in the Y axis direction is fixed upon this shift trolley 26. A carriage 30 is mounted upon this Y axis track 28, and this carriage 30 can shift along the Y axis track 28 in the Y axis direction A plasma torch 42 which generates a plasma arc is installed to this carriage 30, facing towards the table 12 (i.e. facing downwards). And this carriage 30 can shift the plasma torch 42 in the Z axis direction.

The above described laser shuttle 16 and plasma shuttle 18 function as shifting apparatuses for shifting the laser head 40 and the plasma torch 42. The laser shuttle 16 and the plasma shuttle 18 can shift the laser head 40 and the plasma torch 42, respectively, in the X, Y, and Z directions within a working space 32 abutting to the plate material mounted upon the table 12. As will be clear from the figure, the laser head 40 and the plasma torch 42 can be freely shifted in mutually independent directions by independent displacement amounts, simultaneously at different positions within the working space 32, provided that the laser shuttle 16 and the plasma shuttle 18 do not collide upon the X axis track 14. This means that the laser cutting and the plasma cutting can be performed at the same time in parallel, mutually independently.

A laser shuttle parking location 34 and a plasma shuttle parking location 36 are provided at the two end portions of the X axis track 14. When the laser shuttle 16 is positioned in the laser shuttle parking location 34, the laser shuttle 16 is positioned at a position outside of the table 12. Due to this, the plasma shuttle 18 becomes capable of shifting over the entire range of the long side of the table 12, so that the plasma torch 42 can freely shift through the entire working space 32 over the table 12. Conversely, when the plasma shuttle 18 is positioned in the plasma shuttle parking location 36, the plasma shuttle 18 is positioned at a position outside of the table 12. Due to this, the laser shuttle 16 becomes capable of shifting over the entire range of the long side of the table 12, so that the laser head 40 can freely shift through the entire working space 32 over the table 12.

A laser control device 60 is mounted upon the laser shuttle 16, and a plasma control device 62 is mounted upon the plasma shuttle 18. This laser control device 60 and plasma control device 62 are connected to a supervisory control device 64.

Figure 6:
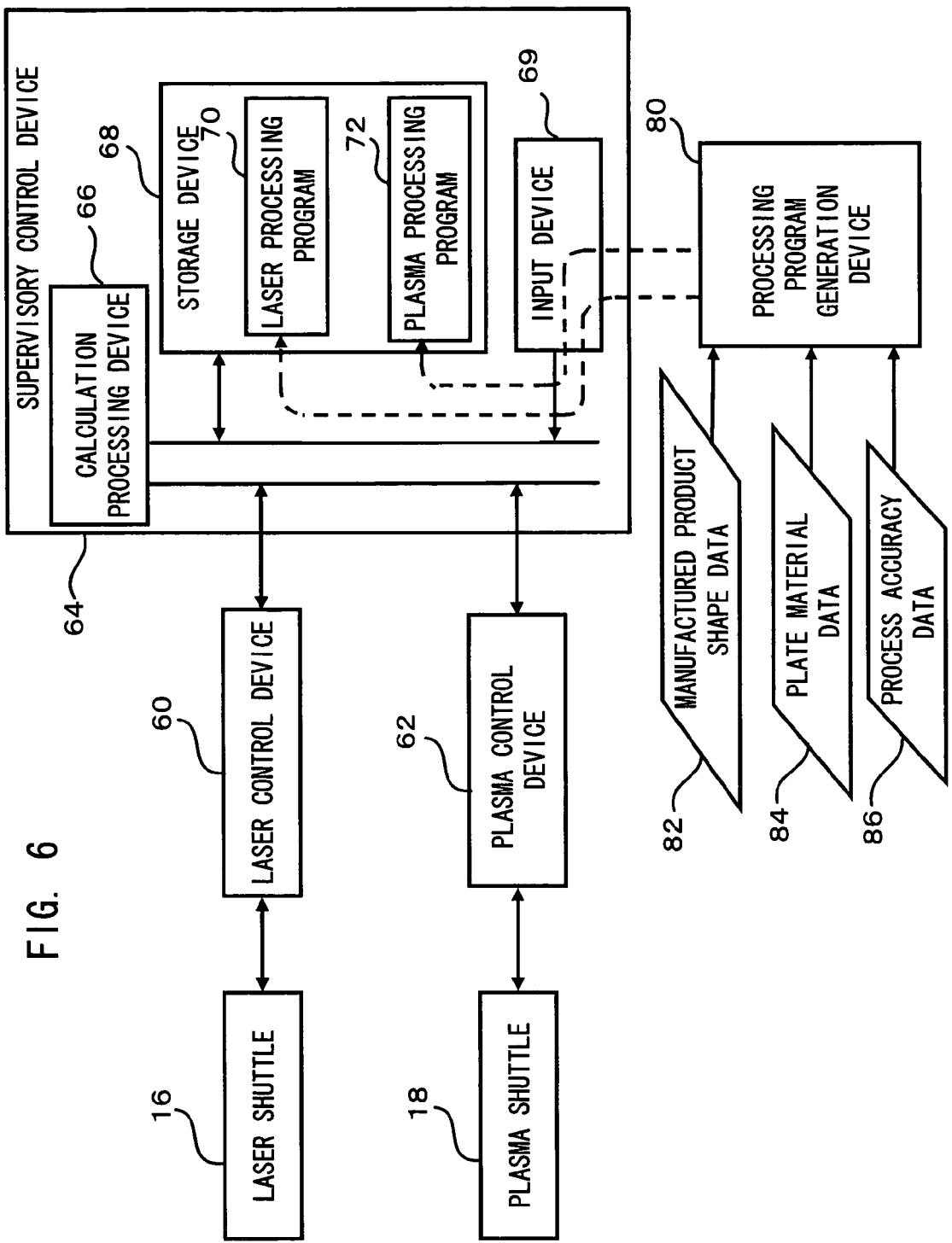
FIG. 6 is a block diagram showing the structures of a laser control device 60, a plasma control device 62, and a supervisory control device 64.

FIG. 6 is a block diagram showing the structures of the laser control device 60, the plasma control device 62, and the supervisory control device 64.

The laser control device 60 controls the operation of shifting the laser head 40 in the X, Y, and Z axial directions with the laser shuttle 16, and the operation of emitting a laser beam from the laser head 40. Furthermore, the plasma control device 62 is mounted to the plasma shuttle 18, and this plasma control device 62 controls the operation of shifting the plasma torch 42 in the X, Y, and Z axial directions with the plasma shuttle 18, and the operation of generating a plasma arc from the plasma torch 42. And the supervisory control device 64 inputs a laser processing program 70 which specifies a working order for laser cutting and a plasma processing program 72 which specifies the working order for plasma cutting with an input device 69 and stores them in a storage device 68, controls the laser control device 60 so as to execute laser cutting with the laser shuttle 16 upon a plate material on the table 12 according to the laser processing program, and controls the plasma control device 62 so as to execute plasma cutting with the plasma shuttle 18 upon a plate material on the table 12 according to the plasma cutting program.

Furthermore, a processing program generation device 80 is provided for creating the laser processing program 70 and the plasma processing program 72. This processing program generation device 80 may be, for example, a personal computer upon which an application program for creating the laser processing program 70 and the plasma processing program 72 is installed; and the device 80 executes this application program.

Figure 7:
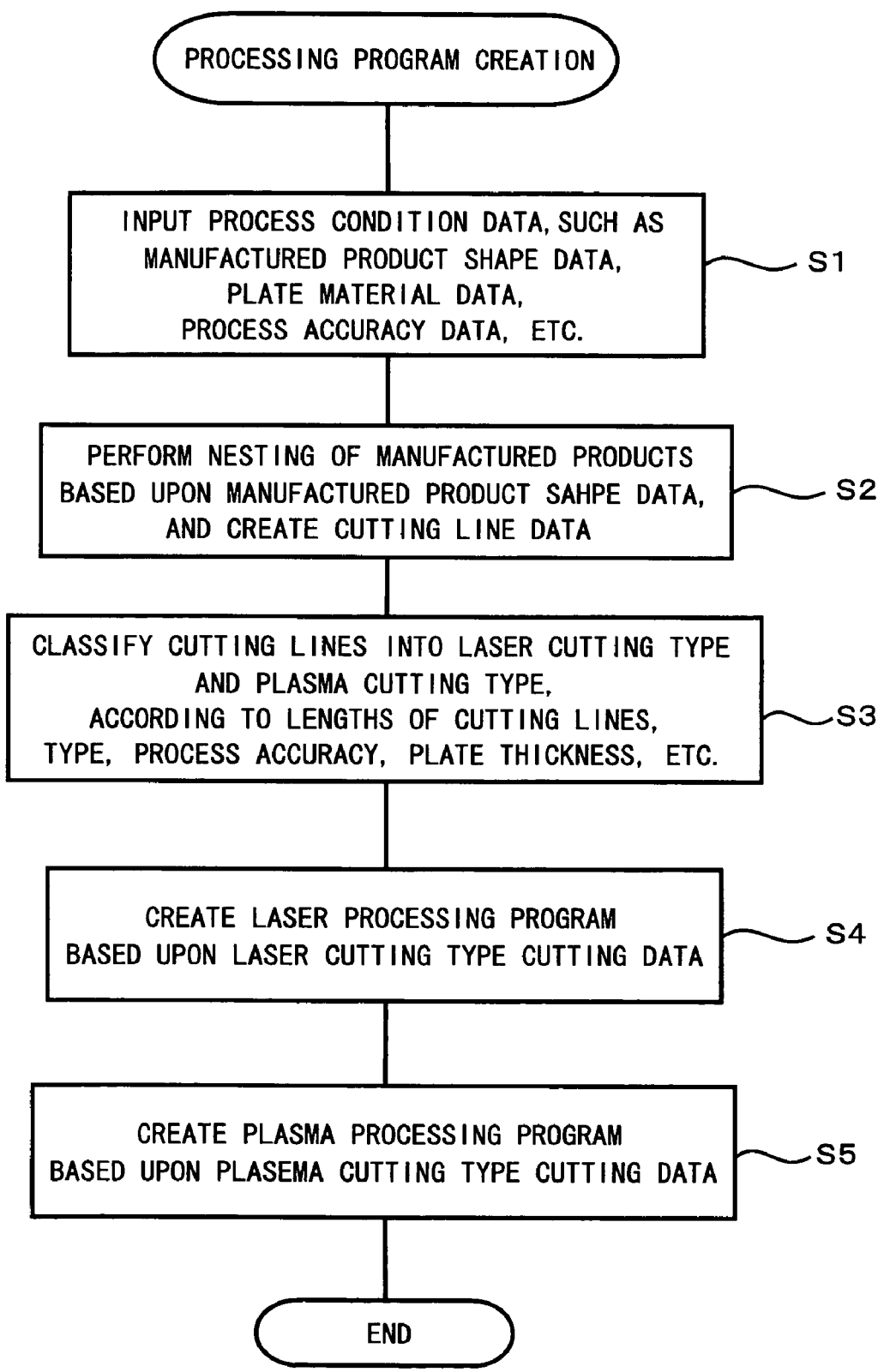
FIG. 7 is a flow chart showing the order in which a processing program generation device generates a laser processing program 70 and a plasma processing program 72.

FIG. 7 is a flow chart showing the steps by which the processing program generation device generates the laser processing program 70 and the plasma processing program 72.

In a step S1 of FIG. 7, the processing program generation device 80 inputs manufactured product shape data 82 by which the shapes of one or a plurality of manufactured products (their external peripheral shapes and the shapes of any apertures) which are to be cut out from the plate material are defined, plate material data 84 which specifies the thickness of the plate material and its material, and process accuracy data 86 which specifies the process accuracy (the dimensional accuracy) for the manufactured products. And, based upon this input data 82, 84, and 86, the processing program generation device 80 performs the processing of steps S2 through S5, and creates the laser processing program 70 and the plasma processing program 72 for cutting out manufactured products of the shapes defined by the manufactured product shape data 82 from a plate material of the thickness and the material specified by the plate material data 84. The laser processing program 70 and the plasma processing program 72 are inputted from the processing program generation device 80 to the supervisory control device 64, on line or off line.

Now, in order to cut out some manufactured products from a plate material, naturally, the plate material is cut along cutting lines which correspond to the shapes of these manufactured products. As cutting lines for cutting out one manufactured product, there is at least a cutting line which corresponds to the external periphery (the contour) of this manufactured product; and furthermore, if this manufactured product has an interior aperture, there is also a cutting line which corresponds to the inner periphery of this aperture. If there are a plurality of such apertures, then there are a plurality of cutting lines corresponding to this plurality of apertures. In this manner, each manufactured product has one or more cutting lines, corresponding to its shape. A large number of cutting lines are normally set for a single plate material, since normally a plurality of manufactured products are cut out from a single plate material.

Thus, in the step S2 of FIG. 7, based upon the shapes of the one or a plurality of manufactured products which have been defined by the manufactured product shaped data 82, the above described processing program generation device 80 performs nesting of this one or a plurality of manufactured products (in other words, designs an arrangement upon the plate material of the manufactured products, which specifies from which locations upon the plate material these manufactured products are to be cut out), and, based upon the result of this nesting, determines upon cutting lines for these manufactured products using coordinate values upon the plate material. Thereafter, in the step S3, the processing program generation device 80 classifies those cutting lines into ones of a laser cutting type which should be cut with the laser head 40, and ones of a plasma cutting type which should be cut with the plasma torch 42. This classification of the cutting lines is performed based upon the geometric characteristics of the various cutting lines (for example, the length of the cutting line, whether the cutting line corresponds to the external periphery of a manufactured product or to an aperture, the size or diameter of the manufactured product or aperture to which the cutting line corresponds, and the like), the process accuracy, the thickness of the plate material, and the like. For example, this classification may be performed based upon one, or upon a combination of two or more, of the following classification methods (1) through (6).

(1) Classification may be performed into the laser cutting type and the plasma cutting type, according to the thickness of the plate material. For example, in the case of a plate material thinner than a predetermined threshold value (for example 6 mm), which is suitable for laser cutting but which is unsuitable for plasma cutting, all of the cutting lines upon that plate material may be classified as being of the laser cutting type. Furthermore, in the case of a plate material thicker than a predetermined threshold value (for example 20 mm), which is suitable for plasma cutting but which is unsuitable for laser cutting, all of the cutting lines upon that plate material may be classified as being of the plasma cutting type.

(2) Classification may be performed into the laser cutting type and the plasma cutting type, according to the process accuracy which is requested. For example, a cutting line which is suited for laser cutting or is unsuited for plasma cutting, and for which a high process accuracy is requested, such as having a dimensional error less than a predetermined threshold value (for example plus or minus 0.3 mm or plus or minus 0.1 mm), may be classified as being of the laser cutting type. Furthermore, a cutting line which is suited for plasma cutting or is unsuited for laser cutting, and for which a process accuracy which is not high is requested, such as having a dimensional error greater than or equal to a predetermined threshold value (for example plus or minus 0.3 mm), may be classified as being of the plasma cutting type.

(3) Classification may be performed into the laser cutting type and the plasma cutting type, according to the length of the cutting line. For example, a cutting line whose continuous cutting length from its cutting start position to its cutting end position is shorter than a predetermined threshold value may be classified as being of the laser cutting type. Furthermore, a cutting line which is continuous cutting length is longer than the predetermined threshold value may be classified as being of the plasma cutting type.

(4) Classification may be performed into the laser cutting type and the plasma cutting type, according to whether the cutting line corresponds to the external periphery of a manufactured product or according to an aperture. For example, a cutting line which corresponds to the external periphery of a manufactured product may be classified as being of the plasma cutting type, while a cutting line which corresponds to an aperture may be classified as being of the laser cutting type.

(5) Classification may be performed into the laser cutting type and the plasma cutting type, according to the diameter or the area of the region which is surrounded by the cutting line, or according to the curvature of the cutting line. In other words, in the case of a cutting line which corresponds to the external periphery of a manufactured product or to an aperture, then, if the diameter of this manufactured product or aperture (if it is not circular, then its longest diameter, its shortest diameter, or its average diameter or the like), or the area of this manufactured product or aperture, is less than a predetermined threshold value (simply put, if the size of the manufactured product or aperture is smaller than a predetermined low threshold value), then this cutting line may be classified as being of the laser cutting type; while, if it is greater than or equal to the predetermined threshold value (simply put, if the size of the manufactured product or aperture is greater than or equal to the predetermined threshold value), then it may be classified as being of the plasma cutting type. Or, if its maximum, minimum, or average radius of curvature is less than a predetermined threshold value, then this cutting line may be classified as being of the laser cutting type; while, if it is greater than or equal to the predetermined threshold value, then this cutting line may be classified as being of the plasma cutting type.

(6) Classification may be performed into the laser cutting type and the plasma cutting type, according to the number of apertures in the manufactured product. In other words, the cutting lines which correspond to the external periphery and to the apertures of a manufactured product of which the number of apertures is greater than or equal to a predetermined threshold value so that the number of apertures is large, may be classified as being of the laser cutting type; while the cutting lines which correspond to the external periphery and to the aperture or apertures of a manufactured product of which the number of apertures is less than the predetermined threshold value so that the number of apertures is small, may be classified as being of the plasma cutting type.

By doing this, in the step S3 of FIG. 7, the processing program generation device 80 classifies the cutting lines of the manufactured products which have been nested upon the plate material into the laser cutting type or the plasma cutting type, according to the thickness of the plate material, the process accuracy, or the geometric characteristics of the various cutting lines. Thereafter, in the step S4 of FIG. 7, the processing program generation device 80 creates the laser processing program 70 based upon the cutting lines which have been classified as being of the laser cutting type, the plate material data 84, and the process accuracy data 86, and further, in the step S5, creates the plasma processing program 72 based upon the cutting lines which have been classified as being of the plasma cutting type, the plate material data 84, and the process accuracy data 86. The laser processing program 70 is a description of a sequence of commands for cutting the plate material with the laser head 40 along only the cutting lines of the laser cutting type, while on the other hand the plasma processing program 72 is a description of a sequence of commands for cutting the plate material with the plasma torch 42 along only the cutting lines of the plasma cutting type. Accordingly, when cutting one or a plurality of manufactured products out from a single plate material with this hybrid cutting device 10, the work is divided between the laser head 40 and the plasma torch 42 according to the thickness of the plate material, the process accuracy, or the geometric characteristics of the various cutting lines.

FIGS. 2 through 5 show various examples of how the work may be divided between the laser head 40 and the plasma torch 42.

Figure 2:
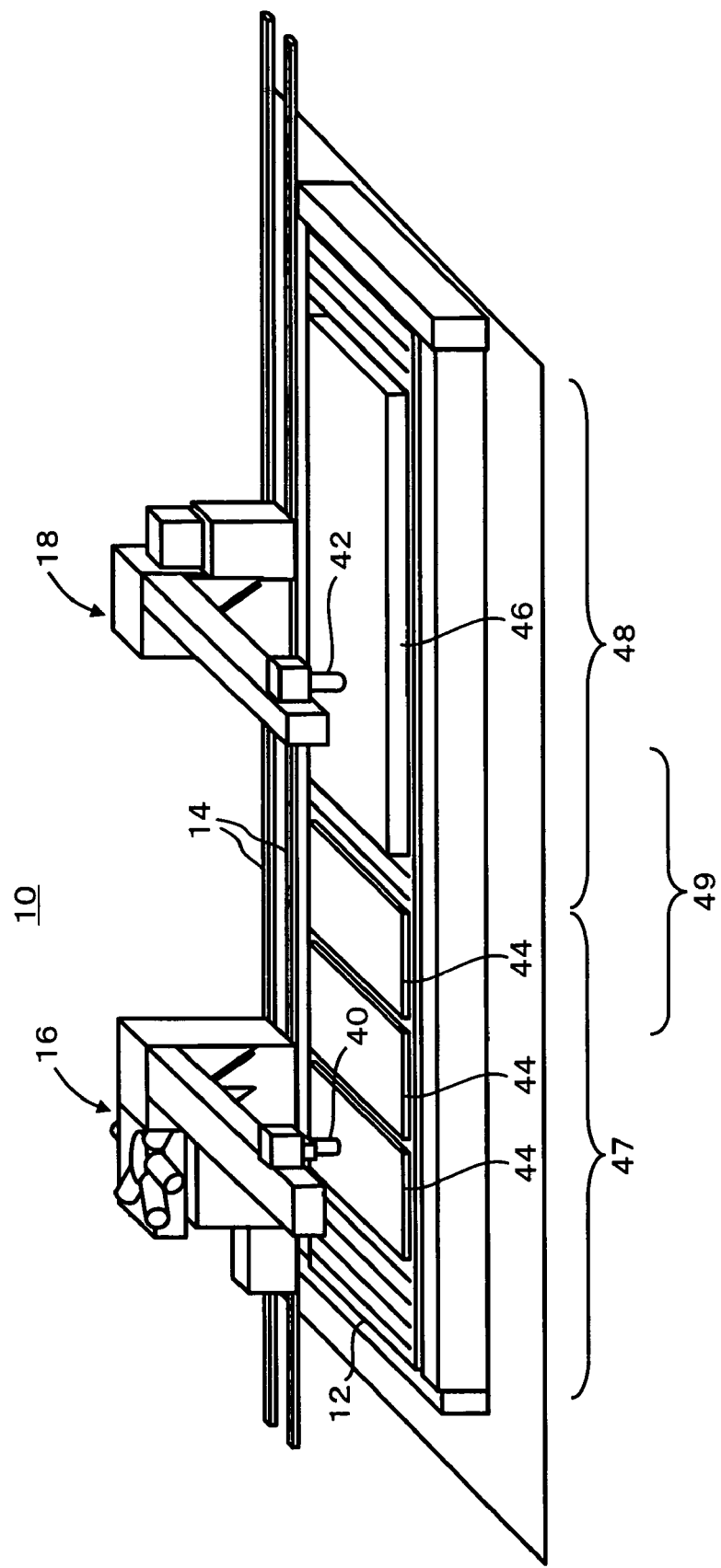
FIG. 2 is a perspective view of the same hybrid thermal cutting apparatus, showing a situation in which either a laser head or a plasma torch is used, according to the thicknesses of the plate materials.

In FIG. 2 there is shown an example in which either the laser head 40 or the plasma torch 42 is used, according to the thickness of the plate material.

As shown in FIG. 2, plate materials 44, 44, 44 which are thinner than the predetermined threshold thickness value, and for which it has been decided by the above described classification method that laser cutting should be applied, are arranged in a region 47 on the left side in the figure of the upper surface of the table 12. And the laser shuttle 16 performs cutting of these thin plate materials 44, 44, 44 according to the laser processing program 70 (FIG. 6) while shifting within a space within the working space 32 (FIG. 1) which corresponds to the above described region 47. Furthermore, a plate material 46 which is thicker than the predetermined threshold thickness value, and for which it has been decided by the above described classification method that plasma cutting should be applied, is arranged in a region 48 on the right side in the figure of the upper surface of the table 12. And the plasma shuttle 18 performs cutting of this thick plate material 46 according to the plasma processing program 72 (FIG. 6) while shifting within a space within the working space 32 (FIG. 1) which corresponds to the above described region 48.

In the process for creating the laser processing program 70 and the plasma processing program 72 for the plate materials 44, 44, 44, and 46, as already explained, the program generation device 80 creates the laser processing program 70 by classifying all of the cutting lines upon the thin plate materials 44, 44, 44 as being of the laser cutting type, due to the thickness of these thin plate materials 44, 44, 44, while it creates the plasma processing program 72 by classifying all of the cutting lines upon the thick plate material 46 as being of the plasma cutting type, due to the thickness of this thick plate material 46. The workman places the thin plate materials 44, 44, 44 upon the left side region 47 of the upper surface of the table 12, and places the thick plate material 46 upon the right side region 48 thereof; and, when he inputs the laser processing program 70 and the plasma processing program 72 to the supervisory control device 64 (FIG. 6) and commands processing to be performed, the laser shuttle 16 is controlled by the laser processing program 70 while the plasma shuttle 18 is controlled by the plasma processing program 72, and thereby the thin plate materials 44, 44, 44 are cut by the laser shuttle 16, and the thick plate material 46 is cut by the plasma shuttle 18, with these tasks being performed mutually independently, at the same time in parallel.

As in the example described above, it is possible to divide the work by taking the left side region 47 upon the table 12 as being the processing region for laser cutting, and by taking the right side region 48 as being the processing region for plasma cutting. Furthermore, it would also be possible, for example, to employ a region 49 in the middle as a combination processing region for cutting the same plate material by combining laser cutting and plasma cutting. This type of division of the work between regions is convenient from the point of view of the operator, and accordingly is often performed.

Figure 3:
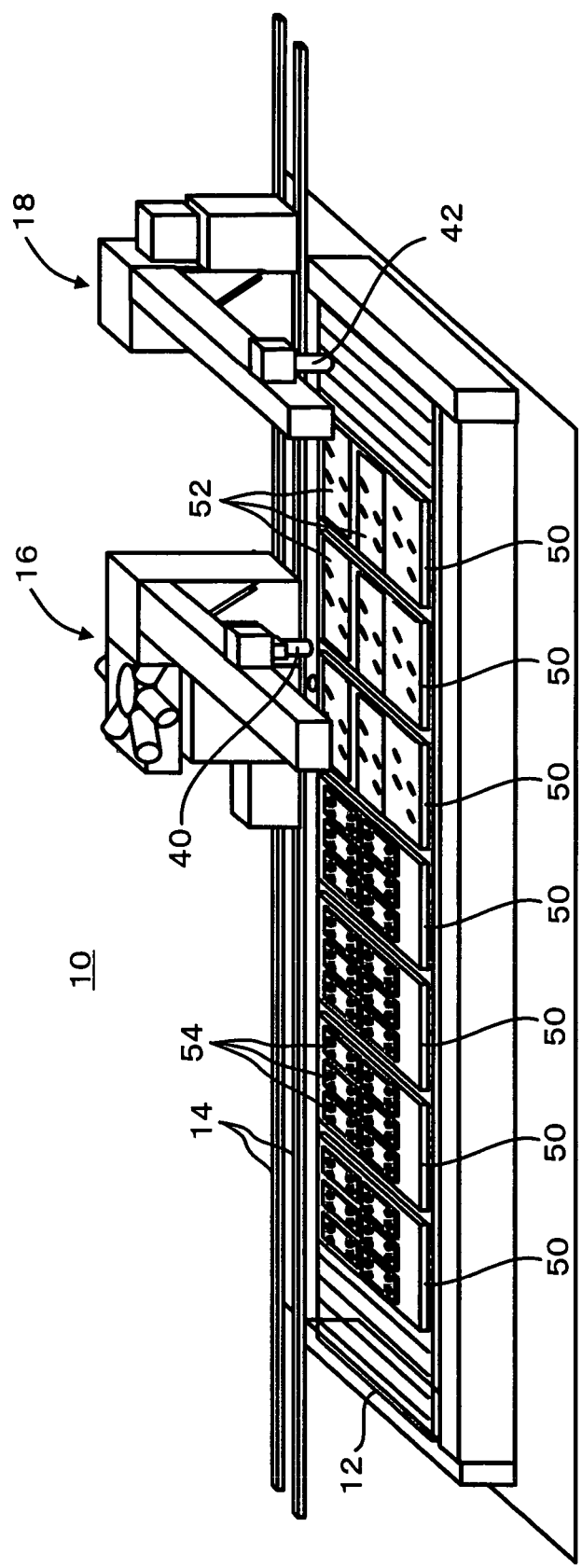
FIG. 3 is a perspective view of the same hybrid thermal cutting apparatus, showing a situation in which work is divided between a laser head or a plasma torch, according to the geometric characteristics of the cutting lines or the process accuracy.
Figure 4:
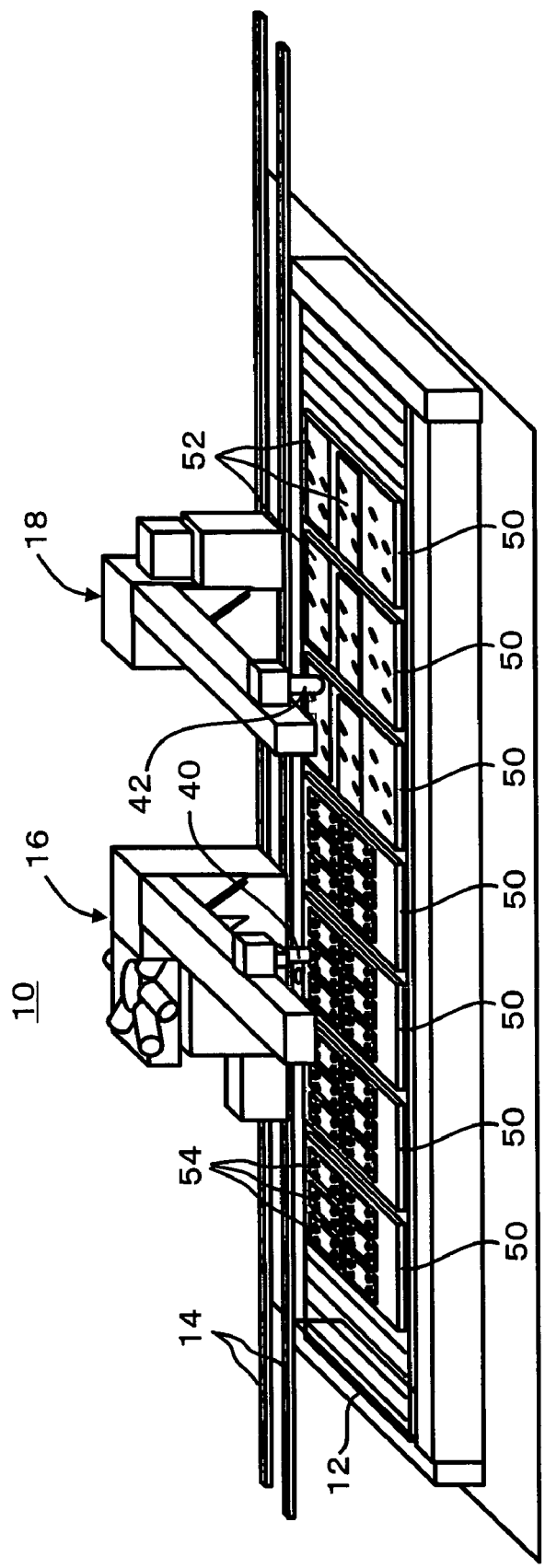
FIG. 4 is a perspective view of the same hybrid thermal cutting apparatus, further showing this situation in which work is divided between the laser head or the plasma torch, according to the geometric characteristics of the cutting lines or the process accuracy.

In FIG. 3 and FIG. 4, there is shown an example in which the same plate materials are cut by a combination of laser cutting and plasma cutting.

As shown in FIG. 3, a plurality of plate materials 50, 50, . . . having a thickness to which both laser cutting and plasma cutting can be applied are mounted upon the table 12. As for example shown in FIG. 8A, it is intended for a plurality of manufactured products 90, 90, . . . , 96, 96, 96, . . . , 98 to be cut out from each of these plate materials 50, 50, . . . , with the manufactured products 90, 90, . . . having apertures 92, and the manufactured products 90, 90, . . . , 96, 96, 96, . . . , 98 and so on having different sizes and shapes. As already explained, the cutting lines for these manufactured products 90, 90, . . . , 96, 96, 96, . . . , 98 are classified by the above described classification method as being of the laser cutting type and the plasma cutting type, according to their geometrical characteristics or the process accuracy or the like, and a laser processing program 70 based upon the cutting lines of the laser cutting type, and a plasma processing program 72 based upon the cutting lines of the plasma cutting type are inputted to the supervisory control device 64.

Figure 8:
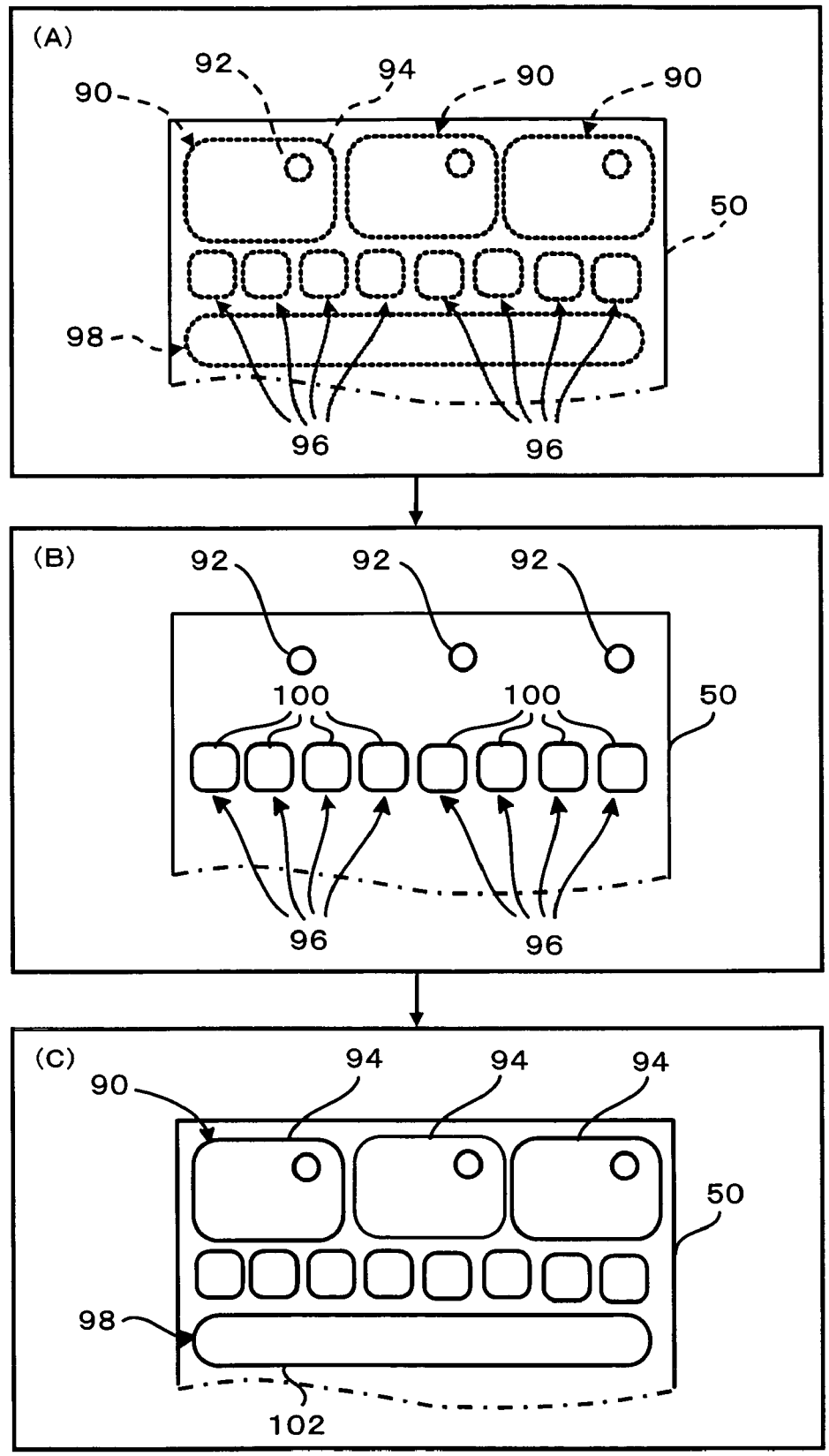
FIG. 8 consists of plan views showing an example of cutting a single plate material 50 by a combination of laser cutting and plasma cutting.

As shown in FIG. 3, based upon the laser processing program 70, the laser shuttle 16 cuts only the cutting lines of the laser cutting type upon the plate materials 50, 50, . . . , while shifting to the left from the right in the figure over the table through the working region 32 (FIG. 1). For example, as shown in FIG. 8B, the cutting lines which correspond to the inner peripheries 92, 92, . . . of the manufactured products 90, 90, . . . and the external peripheries 100, 100, . . . of the small manufactured products 96, 96, . . . or the like may be cut by laser cutting.

Next, as shown in FIG. 4, after the laser shuttle 16, the plasma shuttle 18 cuts only the cutting lines of the plasma cutting type upon the plate materials 50, 50, . . . , while shifting to the right from the left in the figure over the table through the working region 32 (FIG. 1). For example, as shown in FIG. 8C, the cutting lines which correspond to the external peripheries 94, 94, . . . , 102 of the large manufactured products 90, 90, . . . , 98 may be cut by plasma cutting.

The laser shuttle 16 and the plasma shuttle 18 proceed with the laser cutting and the plasma cutting at the same time in parallel while performing shifting along the X, Y, and Z directions in a mutually independent manner, provided that they do not collide together. The sequence for executing the laser cutting and the plasma cutting upon the manufactured products is not limited to first performing the laser cutting and subsequently performing the plasma cutting, as described above; the opposite sequence would also be acceptable, or it would also be acceptable for them to be repeated a plurality of times alternately; but it is often the case that, if the cutting procedure is to be performed based upon the above described method of classification, this sequence, in which cutting of the apertures and the small manufactured products is first performed by laser cutting and cutting out of the external peripheries and the large manufactured products is subsequently performed by plasma cutting, offers good convenience from the point of view of preventing positional deviation upon the table or the like of the manufactured products which have been cut out.

Figure 5:
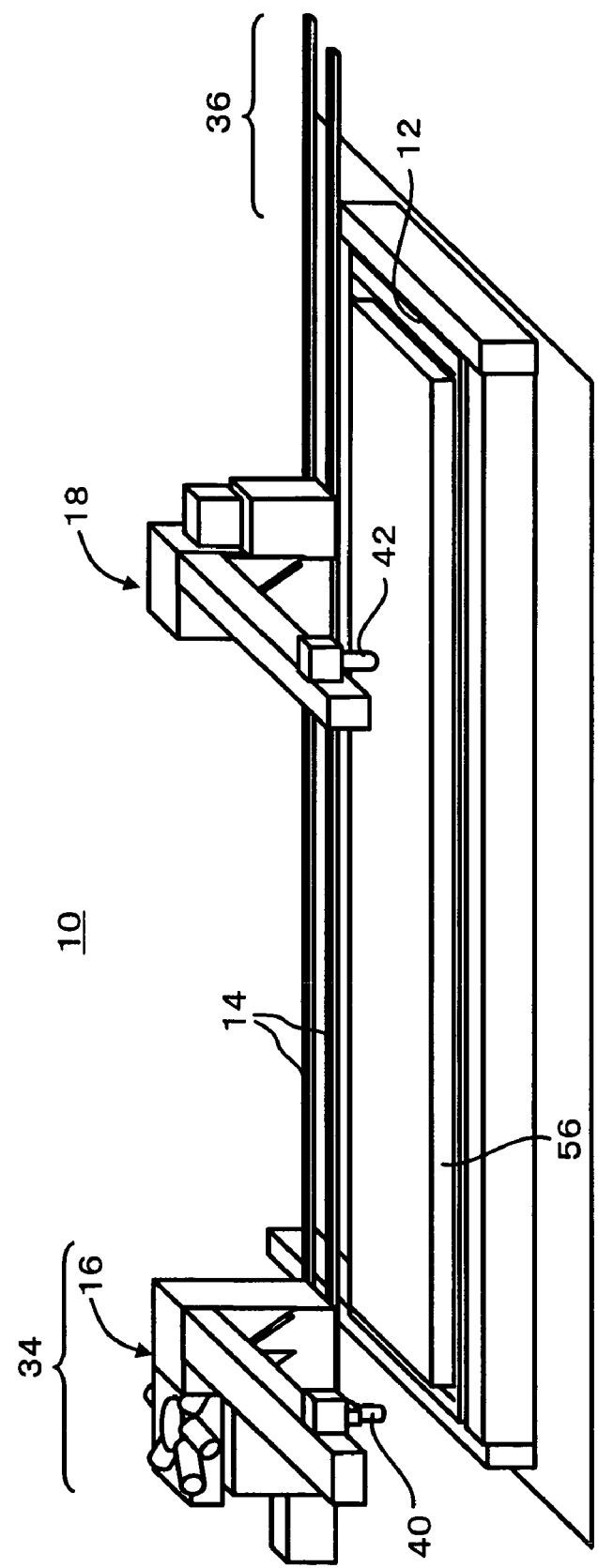
FIG. 5 is a perspective view of the same hybrid thermal cutting apparatus, showing a situation in which, for cutting a thick plate material, only a plasma torch is used.

FIG. 5 shows an example in which a thick plate material, which would be difficult to cut by laser cutting, is cut by plasma cutting only.

As shown in FIG. 5, the laser shuttle 34 is put into its parking location 34, and the plasma shuttle 18 freely shifts over the entire extent of the working region 32 (FIG. 1) while cutting the thick plate material 56 upon the table 12. Furthermore it would also be possible, in an opposite manner to the above example, if a plate material which can only be cut by laser cutting is laid upon the table 12, for the plasma shuttle 18 to be put into its parking location 36, and for the laser shuttle 34 to perform cutting while freely shifting over the entire working region 32 (FIG. 1).

According to the hybrid cutting apparatus 10 explained above, it is possible effectively to reduce the running cost of cutting, as explained below.

Figure 9:
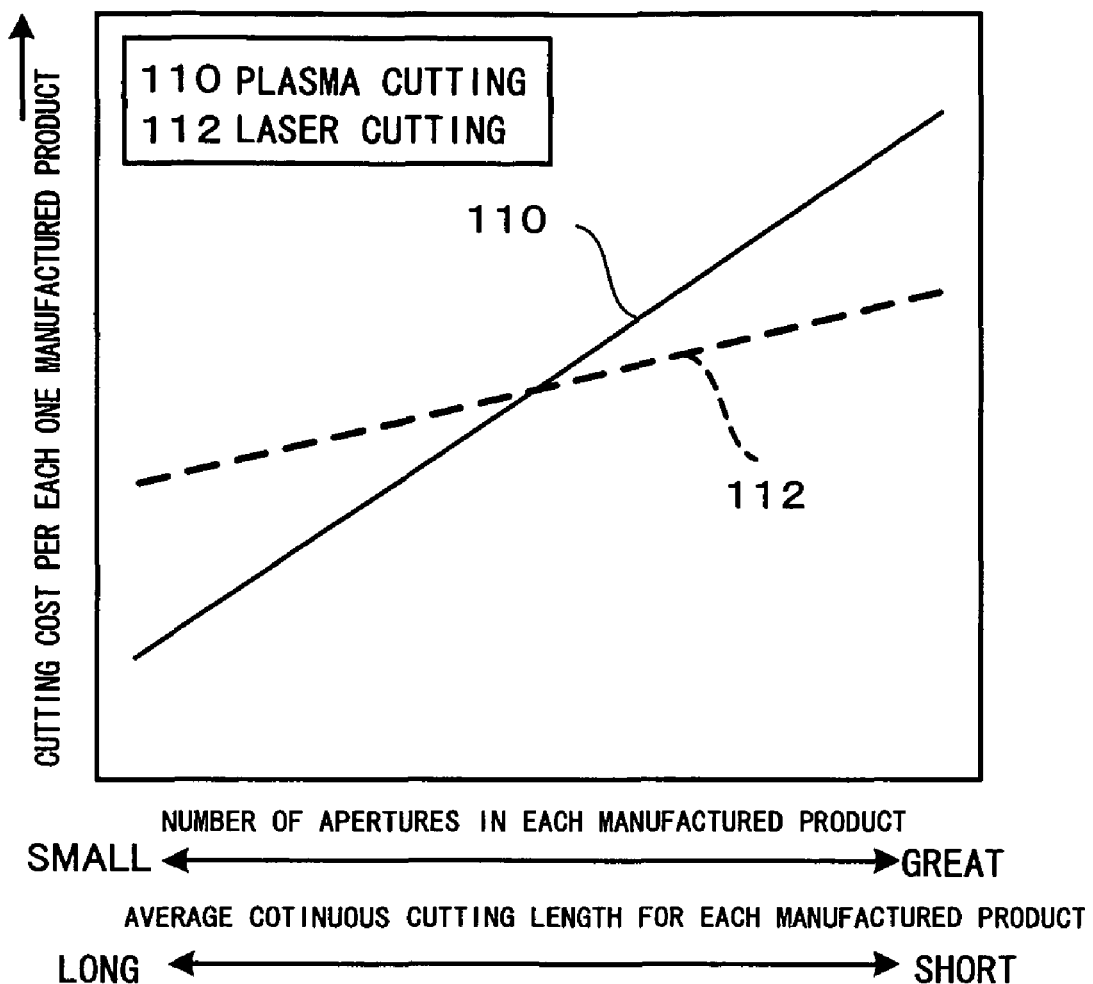
FIG. 9 is a figure schematically showing the variation of running costs of laser cutting and plasma cutting, according to differences in the cutting conditions.

FIG. 9 schematically shows the variation of running costs of laser cutting and plasma cutting, according to differences in the cutting conditions.

In FIG. 9, the graph 110 shows the change of the running cost per one product manufactured by plasma cutting, and the graph 112 shows the change of the running cost per one product manufactured by laser cutting. As seen in this figure, when the number of apertures included in a single manufactured product is investigated, if the number of apertures is quite small, then the running cost for cutting this manufactured product is cheaper with plasma cutting than with laser cutting. Conversely, if the number of apertures is quite large, then the running cost for cutting this manufactured product is cheaper with laser cutting than with plasma cutting. Moreover, when the average value of the continuous length of the one or more cutting lines which are included in a single manufactured product (its external periphery and the inner peripheries of its apertures and so on) is investigated, when the average value of this continuous cutting length is quite long, then the running cost for cutting this manufactured product is cheaper with plasma cutting than with laser cutting, while, conversely, when the average value of this continuous cutting length is quite short, then the running cost for cutting this manufactured product is cheaper with laser cutting than with plasma cutting.

The reason why the size relationship of the running costs of laser cutting and plasma cutting differs according to the cutting conditions in this manner, is that the causes of the running costs of laser cutting and plasma cutting are different. The greater portion of the running cost of laser cutting consists of the costs of electricity and gas. The costs of electricity and gas for laser cutting are greater than they are for plasma cutting. On the other hand, in the running costs of plasma cutting, in addition to the costs of electricity and gas, there is also the cost of ablated materials such as electrodes and the like, and this cost of ablated materials is about two thirds of the total cost. Since the ablation of ablated materials such as electrodes and the like is greatest during the ignition of the plasma arc, accordingly the cost of plasma cutting is most greatly influenced by the number of times of ignition. As a result, in the case of cutting for a long distance continuously, the cost of plasma cutting is cheaper than that of laser cutting; while, in the case of cutting a large number of times for a short distance (where the number of times of ignition is large), the cost of laser cutting is cheaper than that of plasma cutting.

Furthermore, laser cutting has the beneficial aspect that it is possible to obtain higher processing accuracy than with plasma cutting, while on the other hand plasma cutting has the beneficial aspect that it is possible to cut thicker plate materials than with laser cutting. Generally, there is a tendency for small manufactured products or manufactured products which are cut out from thin plate materials to be the ones for which high processing accuracy is demanded.

Due to this situation, as cases in which there is an advantage in performing laser cutting rather than plasma cutting from the point of view of cost, there may be cited the apertures in a manufactured product which has a large number of apertures, a cutting line in which the continuous cutting length is short, a small (high accuracy) manufactured product, a product manufactured from a thin plate (at high accuracy), a process involving only piercing, and the like. Conversely, as cases in which there is an advantage in performing plasma cutting rather than laser cutting from the point of view of cost, there may be cited a manufactured product with a large external periphery, a cutting line in which the continuous cutting length is long, a product manufactured from a thick plate, and the like.

With the hybrid cutting apparatus 10 described above, the cutting lines are classified by a classification method of the type already explained, and, according to this classification method, as decided from the above, that cutting method, among laser cutting and plasma cutting, comes to be utilized for each of the cutting lines, for which the running cost is as cheap as possible. By setting the method of classification appropriately, it is possible to divide up the work between the laser cutting and the plasma cutting so as to perform the cutting processes at the point where the graphs 110 and 112 of FIG. 9 intersect, in other words at the point where the running costs for cutting become minimum.

Furthermore since, with the above described hybrid cutting apparatus 10, it is possible for the laser shuttle 16 and the plasma shuttle 18 to perform their cutting processes at the same time in parallel while each shifting independently, accordingly it is also easy to enhance the efficiency of the cutting process.

Embodiment 2

Next, a second embodiment of the present invention will be explained with reference to FIGS. 10 through 24. In this embodiment, as described hereinafter, the thermal cutting heads are supported by a so called cantilever method, in which the laser head and the plasma torch are both shiftably installed upon the same side surface of a frame which is shaped approximately as a letter "C". Since, for this embodiment, the explanation of the first embodiment may be invoked as appropriate, accordingly, in the following explanation, the description will principally focus upon the points of difference.

Figure 10:
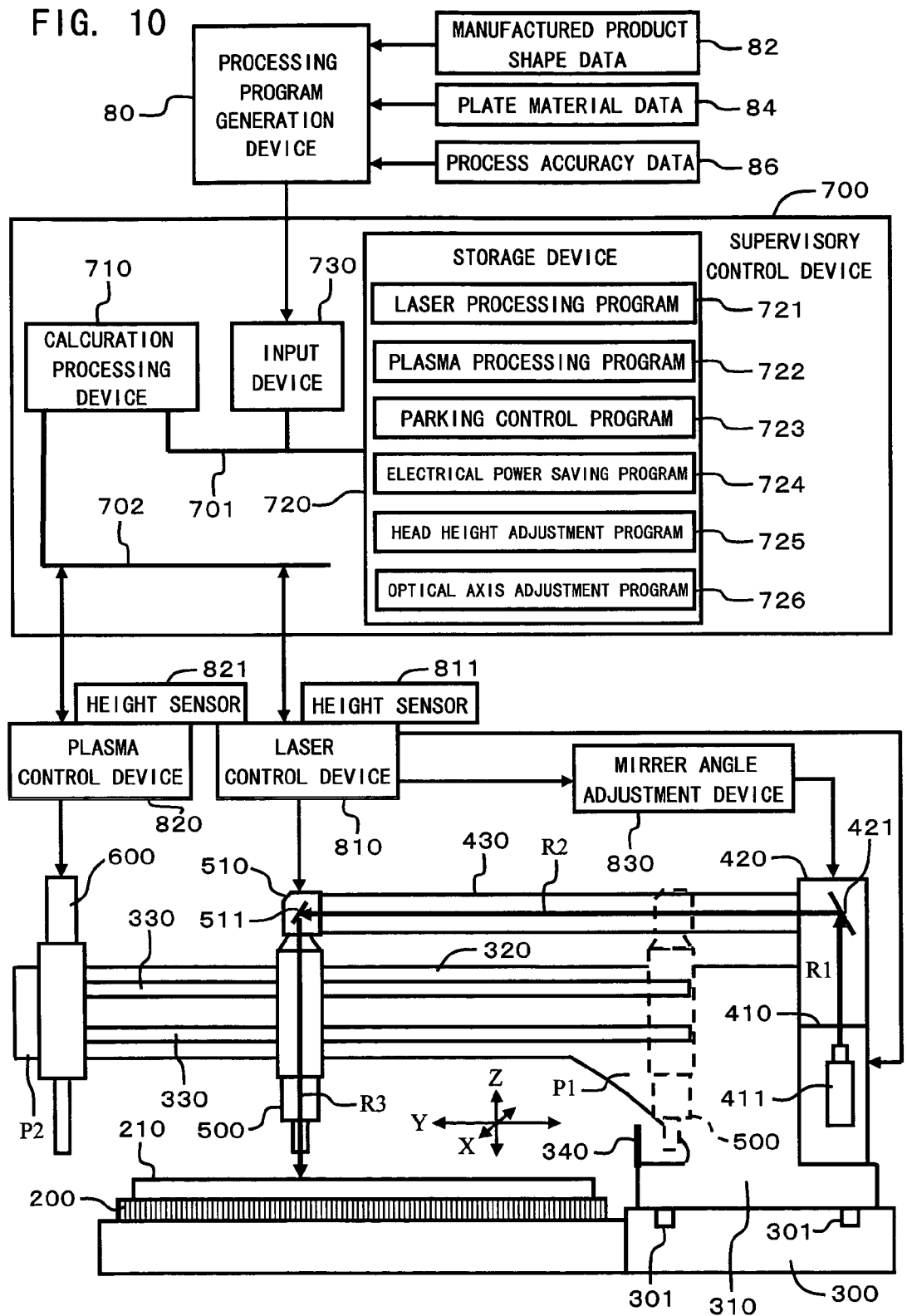
FIG. 10 is an explanatory figure showing the overall structure of a hybrid thermal cutting apparatus according to another embodiment of the present invention.
Figure 11:
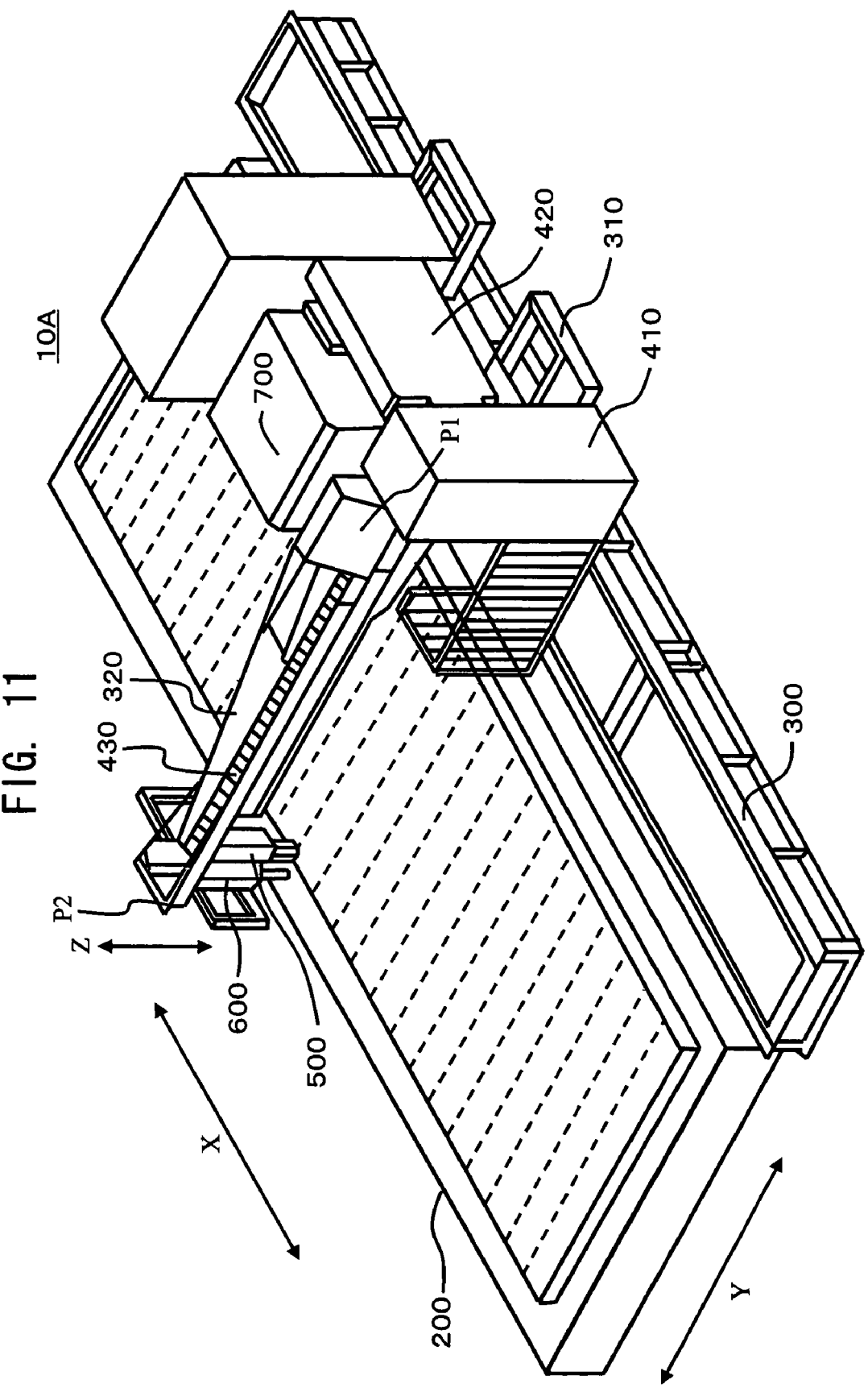
FIG. 11 is a perspective view of this hybrid thermal cutting apparatus.

FIG. 10 is an explanatory figure showing a summary of the structure of the hybrid thermal cutting apparatus 10A according to this embodiment. And FIG. 11 is a perspective view of this hybrid thermal cutting apparatus 10A. The hybrid thermal cutting apparatus 10A of this embodiment may, for example, comprise a processing apparatus main body (200, 300, 500, 600, etc.) and a control device (700, 810, 820) for controlling that processing apparatus main body, both of which will be described hereinafter.

First, the structure of the main body of the processing apparatus will be explained in simple terms. The more detailed structure of this processing apparatus main body will be described hereinafter with reference to others of the drawings. A table 200 is installed upon a floor, in the same manner as the table 12 described with reference to the first embodiment, and is formed in a box shape. The upper surface of this table 200 is formed in a slatted or lattice shape, and a plate material 210 is mounted thereupon.

In order to perform cutting of a plate material 210 which is placed upon the table 200, in this embodiment as well, an orthogonal X-Y-Z coordinate system is defined. As shown in FIG. 11, the X axis is parallel to the long side of the table 200 (the direction piercing through the drawing paper in FIG. 10); the Y axis is parallel to the short side of the table 200 (the horizontal direction in FIG. 10); and the Z axis is perpendicular to the table 200.

A plinth portion 300 is set up in the neighborhood of the table 200 along one of the long sides of the table 200 (i.e. parallel to the X axis direction). X axis tracks 301, 301 are provided upon this plinth 300. A shift support unit 310 is installed upon the plinth 300 so as to be shiftable along the X axis direction.

This shift support unit 310 is provided so as to project upwards from the plinth 300. As shown in FIG. 11, an arm 320 is provided integrally to this shift support unit 310, so as to straddle the top of the table in the Y axis direction. The base end portion P1 of the arm 320 is fixed to the shift support unit 310, while the toe end portion P2 of the arm 320 is made so as to traverse over the table 200. Y axis tracks 330, 330 are provided upon one of the surfaces of the arm facing in the X axis direction. A laser head 500 and a plasma torch 600 are installed upon these Y axis tracks 330, 330 so as to each be shiftable along the Y axis direction. This laser head 500 and plasma torch 600 are installed to the arm 320 so as to face towards the table 200.

The laser head 500 cuts the plate material 210 by irradiating a laser beam emitted from an laser oscillation device 410 via an optical system box 420 and a guide barrel 430 towards the plate material 210, and the like. The laser head 500 is mounted upon a carriage 520 (refer to FIG. 12), and this carriage 520 is installed upon the Y axis tracks 330, 330 so as to be shiftable along the Y axis direction. The carriage 520 is built so that the laser head 500 can be shifted along the Z axis direction. Accordingly, the laser head 500 can be shifted along each of the X axis direction, the Y axis direction, and the Z axis direction.

When the plasma process is being performed, the laser head 500 is parked in a parking region A3 (refer to FIG. 13) which is provided in the neighborhood of the base end portion of the arm 320. A shield portion 340 is provided in this parking region A3. This shield portion 340 suppresses heat and so on during the plasma process from influencing the laser head 500, by at least partially shielding between the working space A1 and the parking region A3.

The plasma torch 600 is a device which cuts the plate material 210 by generating a plasma arc. The plasma torch 600 is mounted upon a carriage 610 (refer to FIG. 12). This carriage 610 is installed upon the Y axis tracks 330, 330 so as to be shiftable along the Y axis direction. The carriage 610 is built so that the plasma torch 600 can be shifted along the Z axis direction. Accordingly, the plasma torch 600 can be shifted along each of the X axis direction, the Y axis direction, and the Z axis direction. When the laser process is being performed, the plasma torch 600 is parked in a parking region A2 (refer to FIG. 12) which is provided in the neighborhood of the toe end portion of the arm 320.

Although this matter will be described in more detail hereinafter, with the hybrid thermal cutting apparatus 10A of this embodiment, it is possible to perform either the laser process or the plasma process by positioning either the laser head 500 or the plasma torch 600 in the working space A1. While the laser process is being performed, the plasma torch 600 is parked in the plasma torch parking region A2. Due to this, the laser head 500 is not hampered by the plasma torch 600, and is able to shift freely through the entire working space A1, thus being able to process the plate material 210. Conversely, since the laser head 500 is parked in the laser head parking region A3 while the plasma process is being performed, accordingly the plasma torch 600 is not hampered by the laser head 500, and can be shifted freely through the entire working space A1.

The laser oscillation device 410 and the optical system box 420 are both provided upon the shift support unit 310. The laser oscillation device 410 is a device for outputting laser rays of a predetermined output from the laser light source 411. And the optical system box 420 is a device for folding the optical path of the laser beam outputted from the laser oscillation device 410, and supplying them towards the laser head 500.

A connection portion 510 is provided to the upper portion of the laser head 500, and a guide barrel 430 is connected to this connection portion 510. This guide barrel 430 is built so as to extend and park freely, as for example with a bellows structure. At its one end the guide barrel 430 is connected to the emission portion of the optical system box 420, and at its other end it is connected to the connection portion 510 of the laser head 500. A folding mirror 511 is provided to the connection portion 510 in order to reflect the laser beam which is incident from the guide barrel 430 in the direction R2 toward the direction shown by the arrow R3.

Next, the structure of the control device will be explained. Just as in the case of the previous embodiment, the control device of this embodiment may comprise, for example, a supervisory control device 700, a laser control device 810, and a plasma control device 820. The supervisory control device 700 comprises a calculation processing device 710, a storage device 720, and an input device 730, just like the supervisory control device in the first embodiment. These devices 710, 720, and 730 are mutually connected together via a communication path 701. Furthermore, the calculation processing device 710 is connected to a laser control device 810 and a plasma control device 820 via a separate communication path 702.

In the storage device 720, there are stored a laser processing program 721, a plasma processing program 722, a parking control program 723, an electrical power saving program 724, a head height adjustment program 725, and an optical axis adjustment program 726. The laser processing program 721 and the plasma processing program 722 are stored in the storage device 720 via the input device 730, since they are created by a processing program generation device 80.

The parking control program 723 is a program which, according to the type of process, parks the laser head 500 and/or the plasma torch 600 in their predetermined respective locations A2 and A3. The electrical power saving program 724 is a program which reduces the amount of electrical power related to the laser process. The head height adjustment program 725 is a program for adjusting the height between the laser head 500 and/or the plasma torch 600, and the plate material 210. And the optical axis adjustment program 726 is a program for finely adjusting the optical axis of the laser light beam which is incident upon the laser head 500, according to the position of the laser head 500 in the Y axis direction. The details of each of these various programs 723 through 726 will be described hereinafter.

The laser control device 810 controls each of the X axis position, the Y axis position, and the Z axis position of the laser head 500, and also the operation of the laser beam. This laser control device 810 may include a height sensor 811. This height sensor 811, for example, may be built as a non contact type sensor using a laser beam or the like. The laser control device 810 measures and adjusts the height between the laser head 500 and the plate material 210 before the laser process is performed, according to the head height adjustment program 725. Thereafter, the laser control device 810 controls the laser head 500 according to the laser processing program 721. Furthermore, the laser control device 810 controls the operation of the laser oscillation device 410 according to the electrical power saving program 724. Moreover, the laser control device 810 performs fine adjustment of the optical axis of the laser light beam supplied to the laser head 500, according to the optical axis adjustment program 726. Each of these various types of control is executed by commands from the supervisory control device 700.

And the plasma control device 820 controls each of the X axis position, the Y axis position, and the Z axis position of the plasma torch 600, and also the operation of the plasma arc. This plasma control device 820 may include a height sensor 821. This height sensor 821, for example, may be built as a contact type sensor using a mechanical limit switch or the like. The plasma control device 820 adjusts the height between the plasma torch 600 and the plate material 210 before the plasma process is performed, according to the head height adjustment program 725. As will be described hereinafter, the data which is measured during the laser process ma be taken advantage of for the plasma process. And the plasma control device 820 also is arranged to perform control related to the plasma process, based upon commands from the supervisory control device 700.

Figure 12:
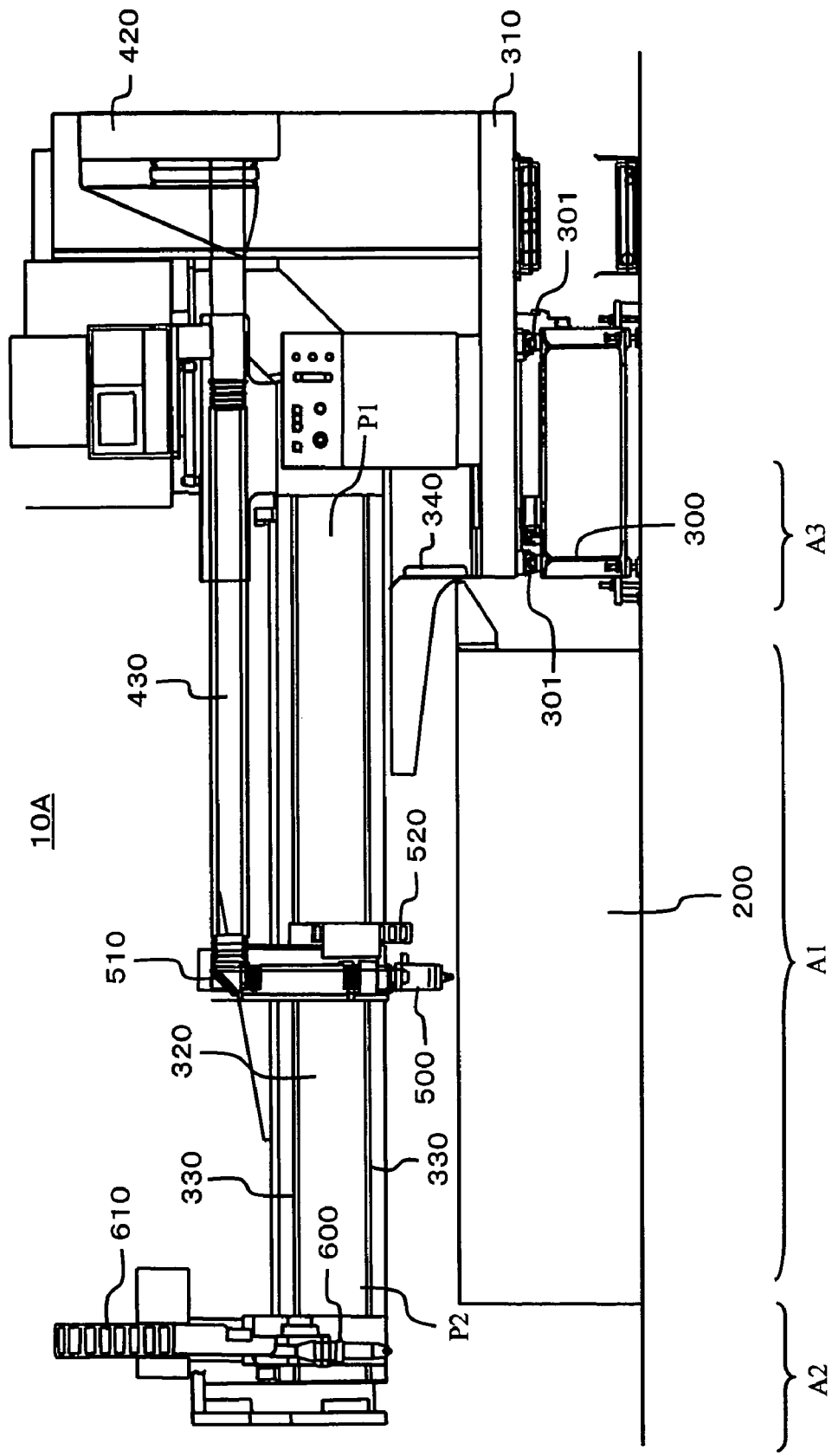
FIG. 12 is an elevation view showing a situation in which a laser process is performed with a plasma torch parked.

FIG. 12 is an elevation view showing the hybrid thermal cutting device 10A as seen from its front along the X axis direction. It should be understood that, since FIGS. 11, 12, and 13 each show the hybrid thermal cutting apparatus 10A schematically for the sake of convenience of explanation, accordingly the small details in these figures may not agree with one another. FIG. 12 shows the case when the laser process is being performed. While this laser process is being performed, the laser head 500 is positioned in the working space A1 over the table 200, while the plasma torch 600 is parked in the parking region A2 which is provided on the left side in the figure. The laser head 500 can shift freely over the working space A1.

Figure 13:
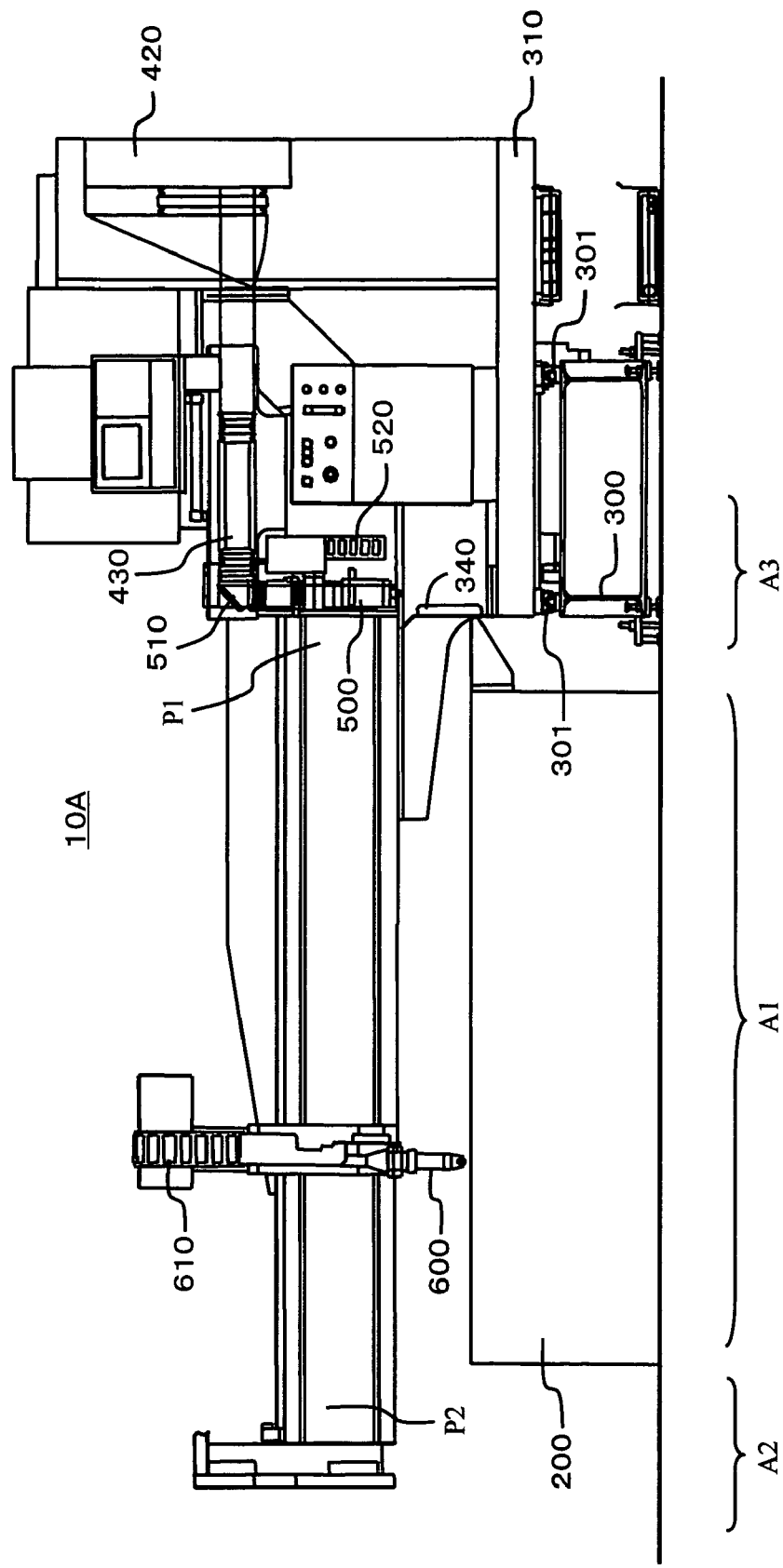
FIG. 13 is an elevation view showing a situation in which a plasma process is performed with a laser torch parked.

FIG. 13 is an elevation view showing the case in which the plasma process is being performed. While this plasma process is being performed, the plasma torch 600 is positioned in the working space A1, while the laser head 500 is parked in the parking region A3 which is provided on the right side in the figure. The plasma torch 600 can shift freely over the working space A1.

Figure 14:
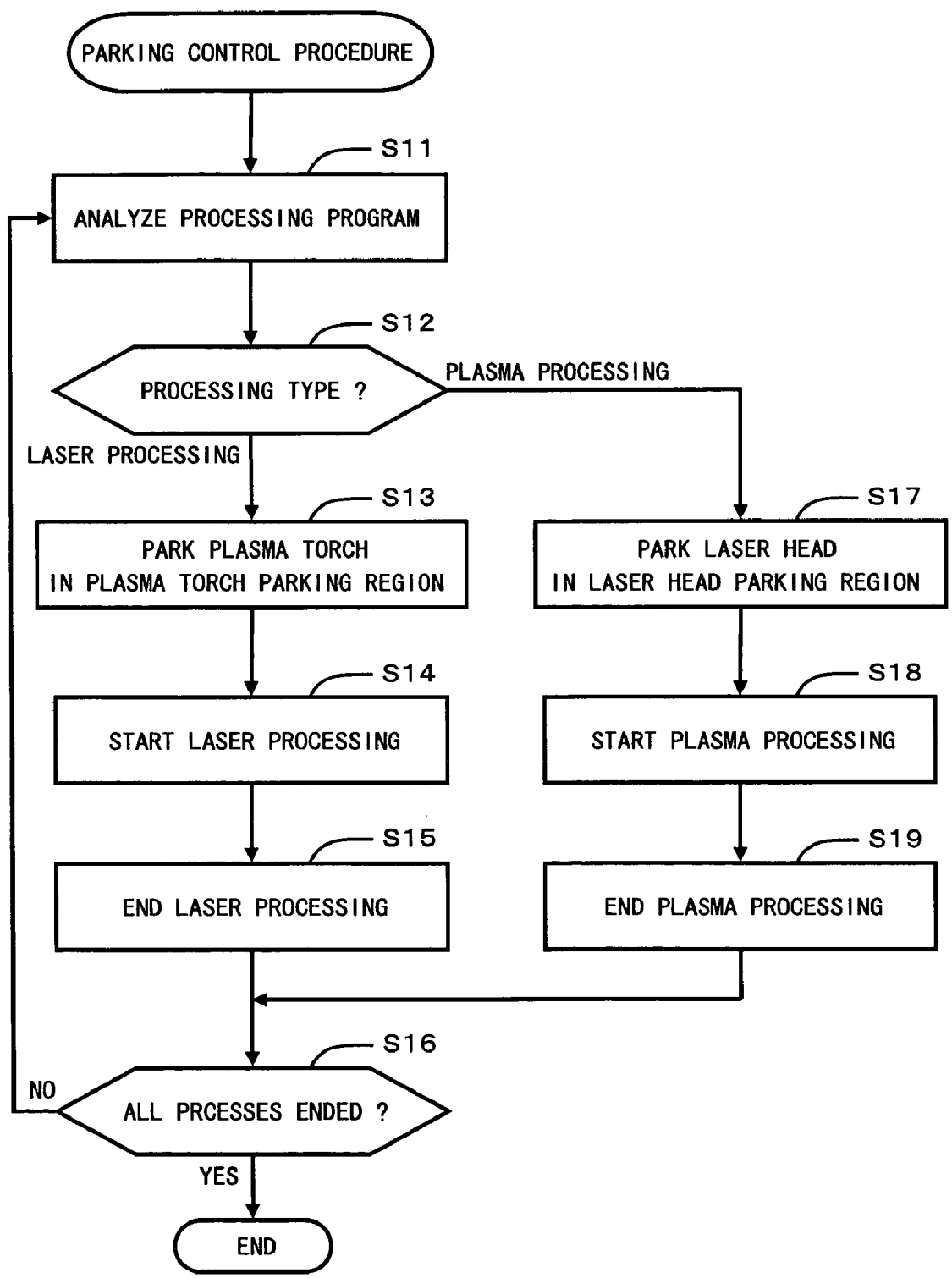
FIG. 14 is a flow chart showing a summary of processing when parking the plasma torch and the laser head, according to the type of process.
Figure 15:
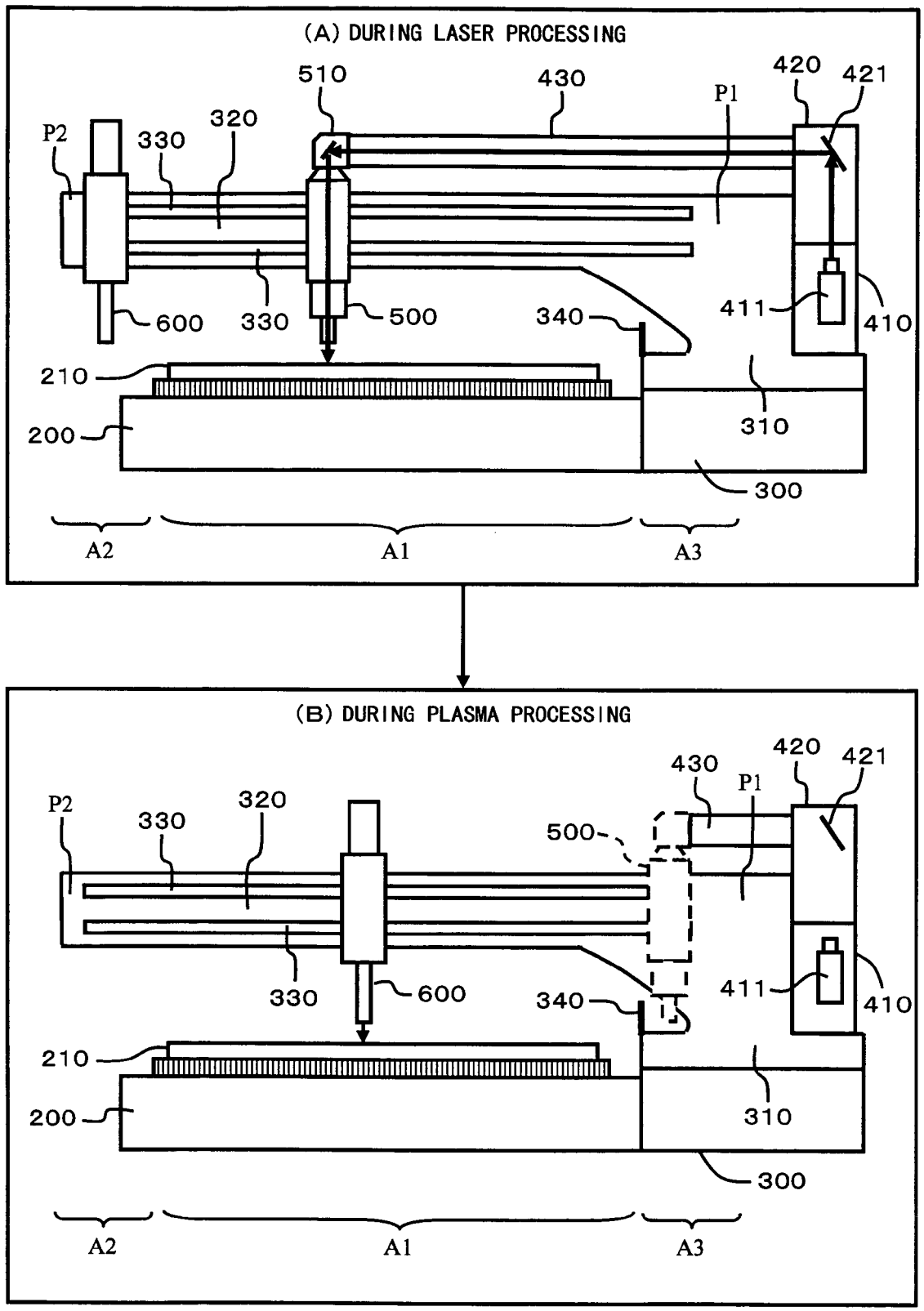
FIG. 15 is an explanatory figure, schematically showing the positions of the laser head and the plasma torch during the laser process and the plasma process; (A) shows the situation during the laser process, and (B) shows the situation during the plasma process.

FIG. 14 is a flow chart showing the parking control procedure. This parking control procedure is implemented, for example, by the calculation processing device 710 reading in and executing a parking control program 732 which is stored in a storage device 720, and by predetermined commands being supplied to each of the laser control device 810 and the plasma control device 820.

The supervisory control device 700 analyzes the processing programs 721, 722 which are stored in the storage device 720 (S11), and decides whether the type of process which they will perform is a laser process or a plasma process (S12). If it has been decided that this process is a laser process, then the supervisory control device 700 issues a park command to the plasma control device 820. Due to this, as shown in FIG. 15(A), the plasma torch 600 is parked in the plasma torch parking region A2 (S13).

After having parked the plasma torch 600 in the parking region A2, when the supervisory control device 700 issues a command to the laser control device 810 based upon the laser processing program 721, the laser process is started (S14). When the laser process ends (S15), the supervisory control device 700 decides whether processing has been completed in relation to all of the plate material 210 or not (S16). If other processing programs exist (S16: YES), then the flow of control returns back to the step S11, and the type of process is decided upon.

On the other hand, if it has been decided that this process is a plasma process, then the supervisory control device 700 issues a park command to the laser control device 810. Due to this, as shown in FIG. 15(B), the laser head 500 is parked in the laser head parking region A3 (S17). After thus parking the laser head 500, the supervisory control device 700 issues a command to the plasma control device 820 based upon the plasma processing program 722, and the plasma process is started (S18). When the plasma process ends (S19), a decision is made as to whether or not processing has been completed in relation to all of the plate material 210 (S16).

Here, the shield portion 340 is provided at the boundary between the laser head parking region A3 and the working space A1. This shield portion 340 is a shield for protecting the laser head 500 from high temperatures and gas and the like, generated during the plasma process.

Since this embodiment has the structure described above, the following beneficial effects are available. In this embodiment, a cantilevered support structure is employed in which each of the laser head 500 and the plasma torch 600 is installed to the arm 320 which straddles over the table 200. Accordingly, as compared to a gantry-type support structure in which the movable arm is supported over the table 200 from both of its ends, it is possible to simplify the construction, and accordingly to reduce the manufacturing cost.

In this embodiment a structure is employed in which, during the laser process, the plasma torch 600 is parked outside of the working space A1, and moreover, during the plasma process, the laser head 500 is parked outside of the working space A1. Accordingly, the laser head 500 does not experience any limitation from the plasma torch 600, and can perform the laser process while freely shifting within the working space A1; while, on the other hand, the plasma torch 600 does not experience any limitation from the laser head 500, and can perform the plasma process while freely shifting within the working space A1.

In this embodiment, a structure is employed in which the laser head parking region A3 is provided at the base of the arm 320, while the plasma torch parking region A2 is provided at the toe end portion of the arm 320; and the laser head 500 is provided towards the base end portion of the arm 320, while the plasma torch 600 is provided towards the toe end portion of the arm 320. As a result, when the laser head 500 is parked in the laser head parking region A3, it is possible for the length of the guide barrel 430 which extends and retracts freely to be at its shortest, so that, during the plasma process, it is possible to protect both the laser head 500 and the guide barrel 430 from heat and gas and the like. It should be understood that, conversely to the above, it might be considered to provide the laser head parking region towards the toe end portion of the arm 320. However, in this case, when the laser head 500 is parked, the length of the guide barrel 430 is maximum, and it is exposed over its maximum length in the working space A1. Accordingly the possibility is high that the guide barrel 430 will experience some external influence.

In this embodiment, the structure is such that the shield portion 320 is provided between the laser head parking region A3 and the working space A1. Accordingly, it is possible to protect the laser head 500 from the plasma processing which is being performed in the working space A1, and thereby the reliability is enhanced.

Embodiment 3

Figure 16:
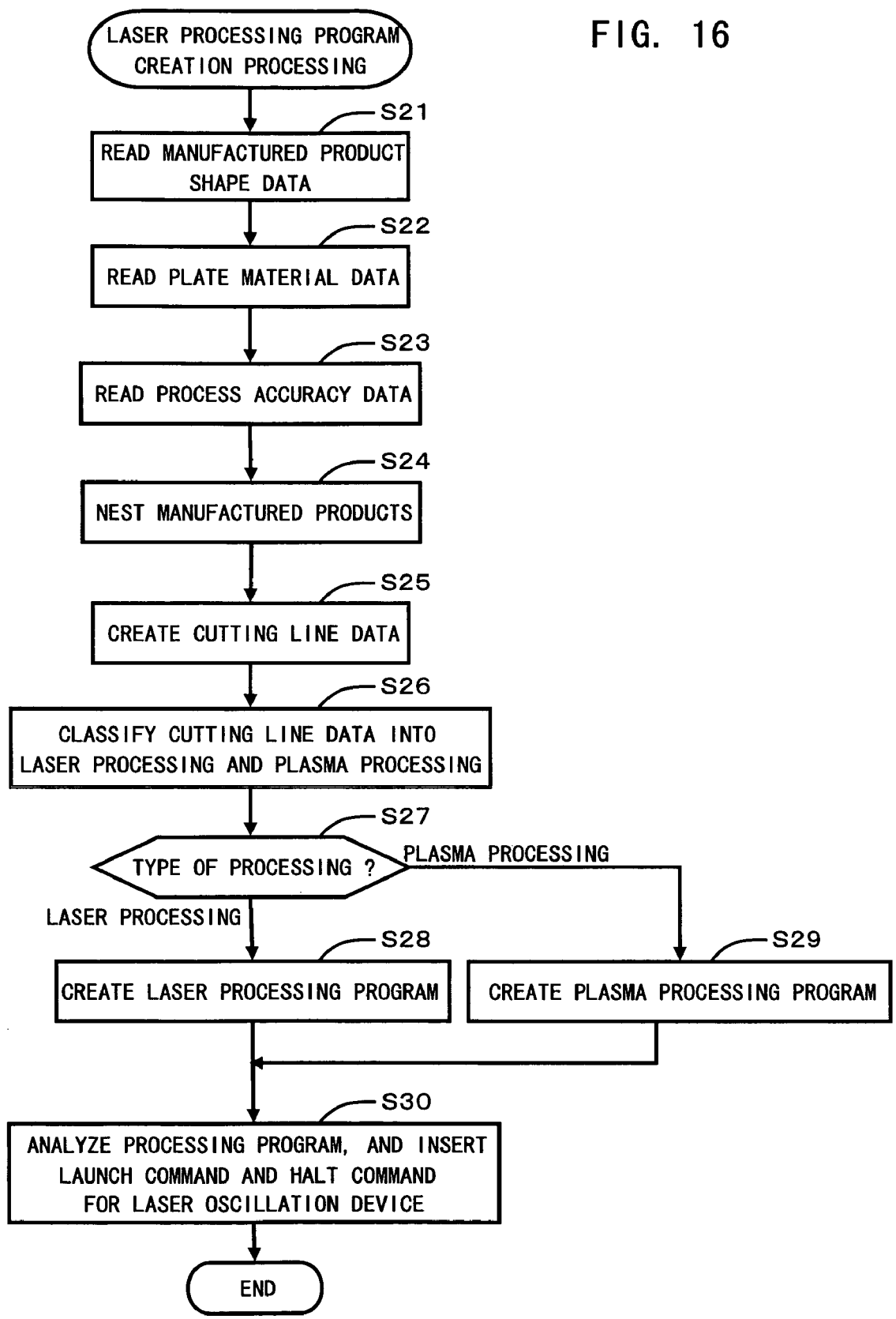
FIG. 16 is a flow chart showing a summary of processing for creating a laser processing program which is adapted to reducing the amount of electrical power used in the laser process.
Figure 17:
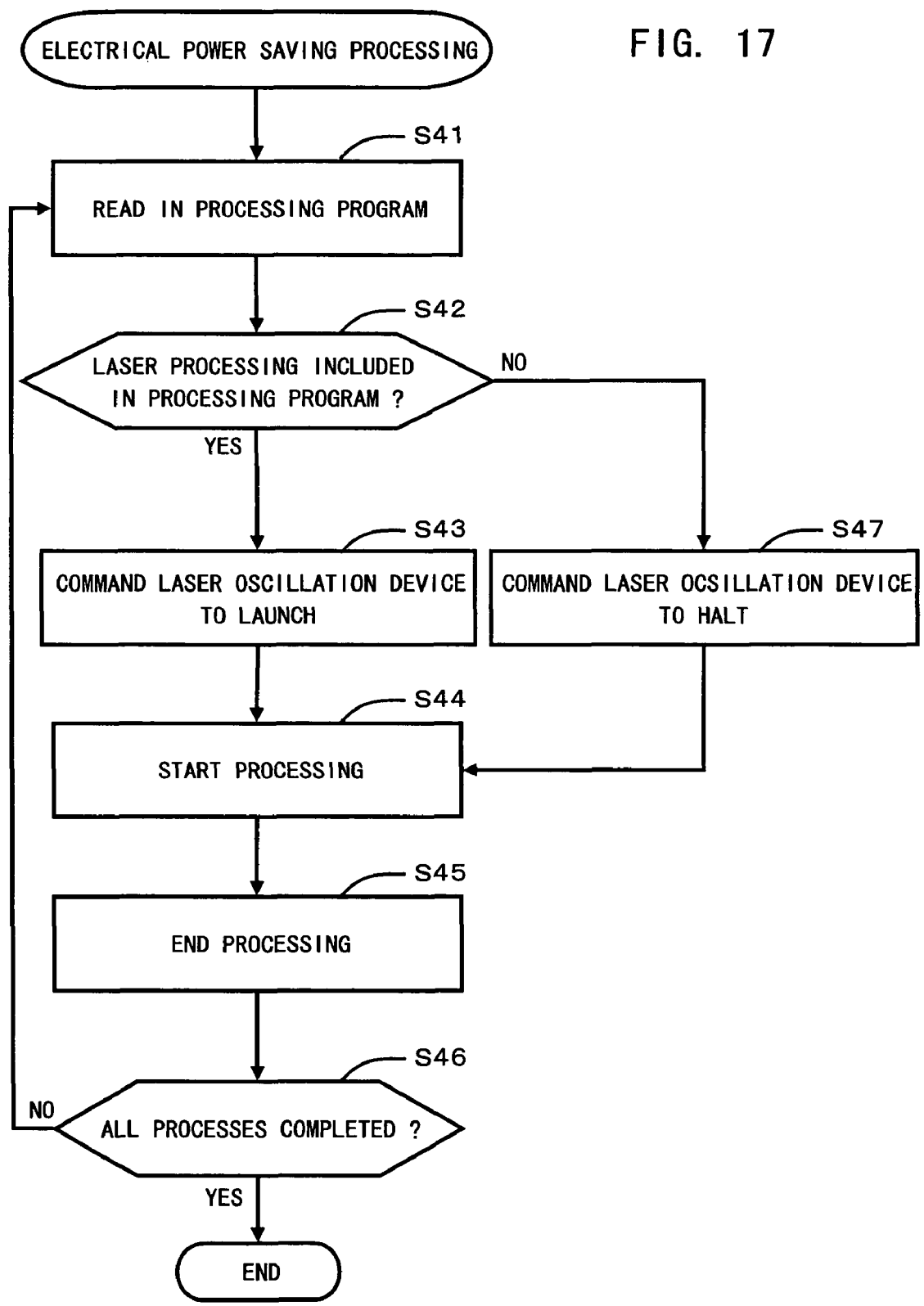
FIG. 17 is a flow chart showing a summary of processing for performing the laser process based upon this laser processing program.

Next, a third embodiment of the present invention will be explained based upon FIGS. 16 and 17. In this embodiment, the amount of electrical power consumption during the laser process is reduced. FIG. 16 is a flow chart showing a summary of the processing for creating the laser processing program. When the processing program generation device 80 receives each of manufactured product shape data 82 (S21), plate material data 84 (S22), and process accuracy data (S23), it performs arrangement (nesting) of the manufactured products (S24), and creates cutting line data (S25).

The processing program generation device 80 classifies the cutting line data into either data for lines for laser processing or data for lines for plasma processing, just as described above with reference to the first embodiment (S26). In the case of cutting line data suitable for laser processing, the processing program generation device 80 creates a laser processing program (S28). And, in the case of cutting line data suitable for plasma processing, the processing program generation device 80 creates a plasma processing program (S29).

And the processing program generation device 80 analyzes the processing programs which it has created, and inserts, for example, commands for controlling the laser oscillation device 410 (S29). As these appended commands, for example, there may be cited launch command and halt command for the laser oscillation device 410. A launch command is a command for warming up the device so as to be able to supply the laser beam. A halt command is appended so as to match the timing at which the laser processing is started. And a halt command is a command for stopping the laser oscillation device 410. When it is put into this shutdown state, the electrical power consumption of the laser oscillation device 410 is decreased.

The time period which is taken for processing the cutting line data may be obtained based upon, for example, the lengths of the cutting lines or the thickness of the plate material 210 or the like. Accordingly, it is possible to estimate the waiting time period before the laser processing is started. If this waiting time period is greater than or equal to a predetermined time period, then, by appending a halt command to the processing program, it is possible to reduce the waiting electrical power for the laser oscillation device 410. Here, the predetermined time period is approximately equal to the time period which it takes to launch the laser oscillation device 410. If this waiting time period is longer than the time period which is necessary for performing stabilized laser oscillation, then the laser oscillation device 410 is stopped. In this manner, it is possible to make it explicit whether the laser oscillation device 410 is operated or is stopped, at the stage of creating the processing program.

Based upon FIG. 17, another example of implementation of electrical power saving operation during the laser processing will now be explained. FIG. 17 is a flow chart showing a summary of this electrical power saving processing for economizing upon electrical power during the laser processing.

The supervisory control device 700 reads in the processing program which has been stored in the storage device 720 (S41), and decides whether laser processing is included in this processing program or not (S42). If laser processing is included (S42: YES), then the supervisory control device 700 commands raising of the laser oscillation device 410 (S43). When the laser oscillation device 410 has risen and it is possible to output the laser beam in a stable manner, then the laser processing is started (S44). When the laser processing is ended (S45), the supervisory control device 700 make a decision as to whether or not all of the processing related to this plate material 210 has been completed (S46). If processing programs exist which have not been processed, then the flow of control returns to the step S41.

On the other hand, if no laser processing is included in the processing program which is to be performed next (S42: NO), then the supervisory control device 700 commands the laser oscillation device 410 to halt (S47). Due to this, the laser oscillation device 410 waits, with its power consumption at the lowest required level. And the plasma processing is performed (S44), and soon the plasma processing is completed (S46).

With this embodiment as structured in this manner, in addition to the beneficial effects which have been described with reference to the second embodiment, it is also possible to reduce the consumption of electrical power during the laser processing. Accordingly, it is possible to reduce the operating cost of this hybrid thermal cutting device 10A.

Embodiment 4

Next, a fourth embodiment of the present invention will be explained based upon FIGS. 18 and 19. In this embodiment data related to measurement of the heights of the heads is shared in common between the laser head 500 and the plasma torch 600.

Figure 18:
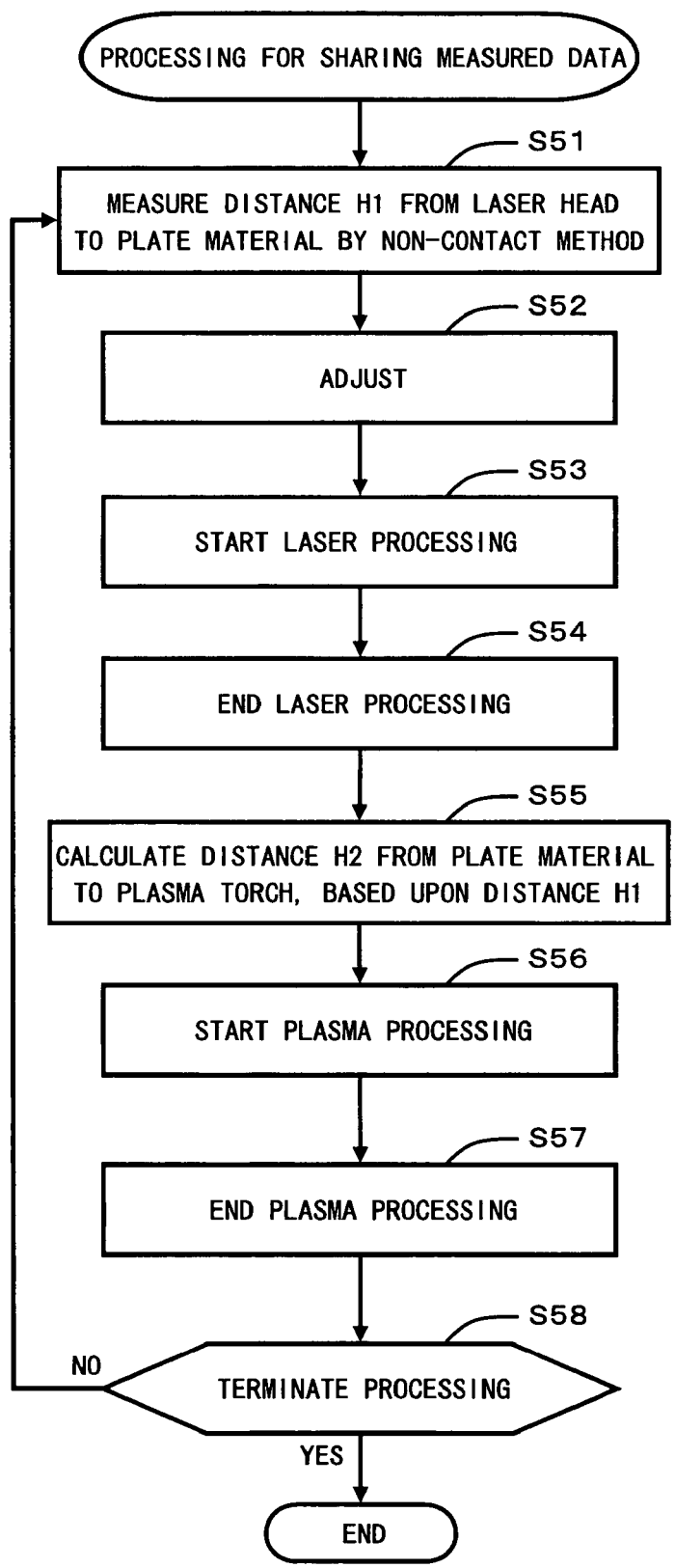
FIG. 18 is a flow chart showing a summary of processing for performing the plasma process by using distance data which has been measured in relation to the laser head.

FIG. 18 is a processing flow chart showing a situation in which data which has been measured during the laser processing is also taken advantage of for performing the plasma processing. When performing the laser processing, the supervisory control device 700 measures the distance H1 from the laser head 500 to the plate material 210 (S51). This distance measurement may be performed by the non contact type height sensor 811.

The laser control device 810 finely adjusts the height of the laser head 500 based upon the distance H1 which has been measured (S52), and starts the laser processing (S53). When the laser processing is completed (S54), next the plasma processing is performed.

If the plasma control device 820 is provided with a height sensor 821, then it is possible to measure the distance H2 between the plasma torch 600 and the plate material 210 over again by using this height sensor 822 for the plasma torch. However, in this case, a certain time period is required for this measurement of the distance H2 over again, so that it takes a certain time period to change over from the laser processing to the plasma processing. In particular, if the height sensor 821 for the plasma torch is a contact type sensor, the changeover time period is increased, since the time period for measurement is quite long.

Thus, in this embodiment, if the same plate material is to be the subject for further processing, and if laser processing has been performed first, then the distance H1 which has been measured during this laser processing is employed. In other words, the supervisory control device 700 calculates the distance H2 between this plate material 210 and the plasma torch 600 (S55) based upon the distance H1 between the laser head 500 and the plate material 210. Since the positions in the X-Y-Z coordinate system at which the plasma torch 600 and the laser head 500 are fitted are already known, accordingly it is possible to calculated the distance between the plasma torch 600 and the plate material 210 based upon the differential ΔH between the height positions of the two of them, and upon the distance H1 (H2=H1+ΔH).

The supervisory control device 700 starts the plasma processing after having minutely adjusted the height of the plasma torch 600 based upon this distance H2 which has thus been calculated (S56). When the plasma process is completed (S57), a decision is made as to whether or not further processing is to be made for a different plate material (S58), and, if processing of a different plate material is to be performed (S58: YES), then the flow of control returns to the step S51.

Figure 19:
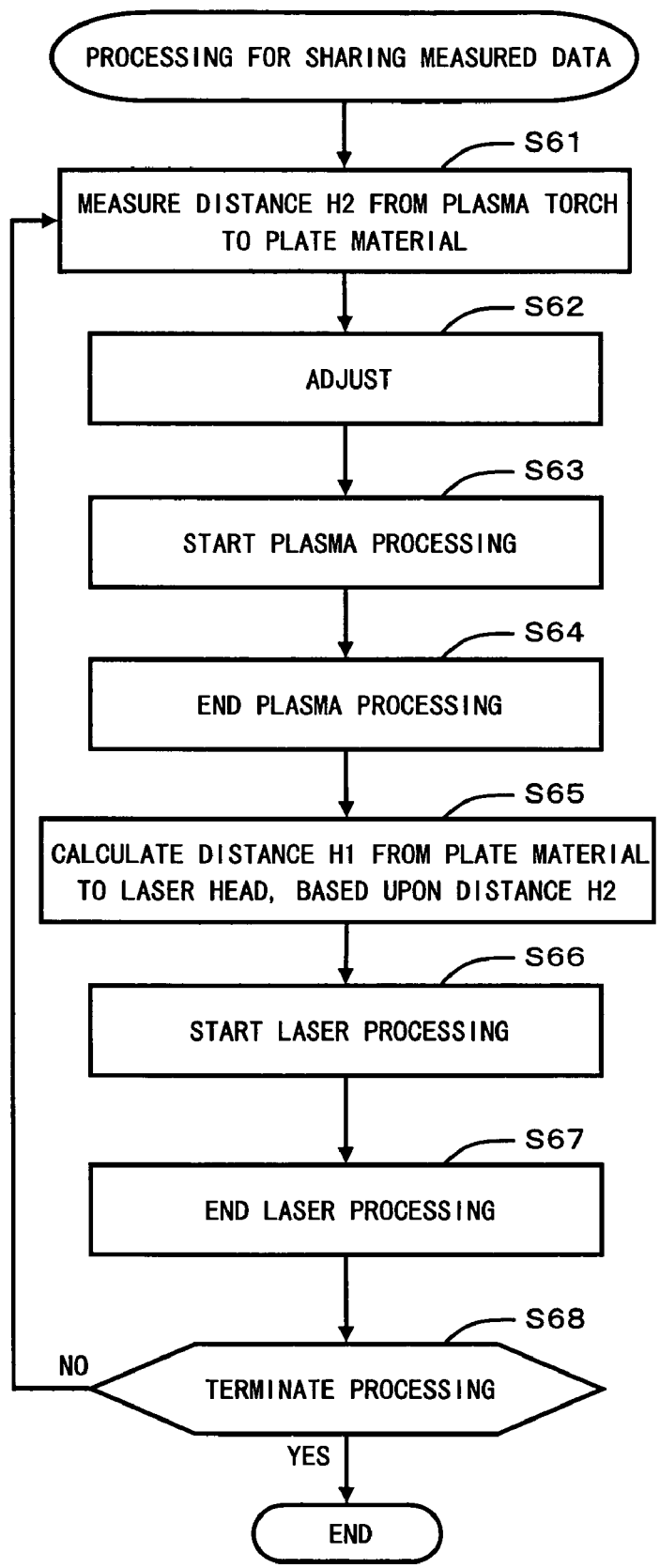
FIG. 19 is a flow chart showing a summary of processing for performing the laser process by using distance data which has been measured in relation to the plasma torch.

FIG. 19 is a flow chart showing the case in which, conversely to the example shown in FIG. 18, the data which has been measured during the plasma processing is also used for performing the laser processing. The supervisory control device 700 measures the distance H2 between the plasma torch 600 and the plate material 210 (S61) and performs the plasma processing (S62, S63, S64).

When changing over from the plasma processing to the laser processing, the distance H1 between the laser head 500 and the plate material is calculated (S65) based upon the distance H2 which has already been measured, and then the laser processing is performed (S66, S67). And if, for example, the plate material is to be changed and further processing is to be performed (S68: NO), then the flow of control returns to the step S61.

With this embodiment structured in this manner, the same beneficial operational effects are manifested as in the case of the second embodiment. In addition to this, in this embodiment, the structure is such that the distance data which has been measured during the first process to be performed is taken advantage of in the process of a different type which is performed subsequently. Accordingly, it is possible to shorten the time period for changing over between the laser processing and the plasma processing for the same plate material, so that it is possible to enhance the efficiency.

In particular, if first the laser processing is performed, in which distance measurement is performed at high accuracy by a non contact method, then it is possible to calculate the distance H2 during the plasma processing at high accuracy and moreover in a short time period, based upon this distance data which has been obtained at high accuracy and moreover in a short time period. By contrast, if the plasma processing is performed before the laser processing, then the measurement of the distance H2 by the contact type height sensor 821 is initially performed. However, generally the accuracy of the contact type height sensor 821 is inferior as compared to that of the contact type height sensor 811, and also the time period for measurement is longer. Thus although, in this embodiment, the case was also shown in which the distance H1 between the laser head 500 and the plate material was calculated based upon the distance H2 which was measured during the plasma processing (FIG. 19), it is more advantageous to calculate the distance H2 between the plasma torch 600 and the plate material based upon the distance H1 which has been measured during the laser processing, as shown in FIG. 18.

Embodiment 5

Now, a fifth embodiment of the present invention will be explained with reference to FIGS. 20 through 24. In this embodiment, the optical axis of the laser beam which is emitted from the optical system box 420 is finely adjusted according to the position of the laser head 500 in the Y axis direction. The reason why it is necessary to adjust the optical axis according to the Y axis position of the laser head 500 will be described hereinafter together with FIG. 22; first, the structure will be explained.

Figure 20:
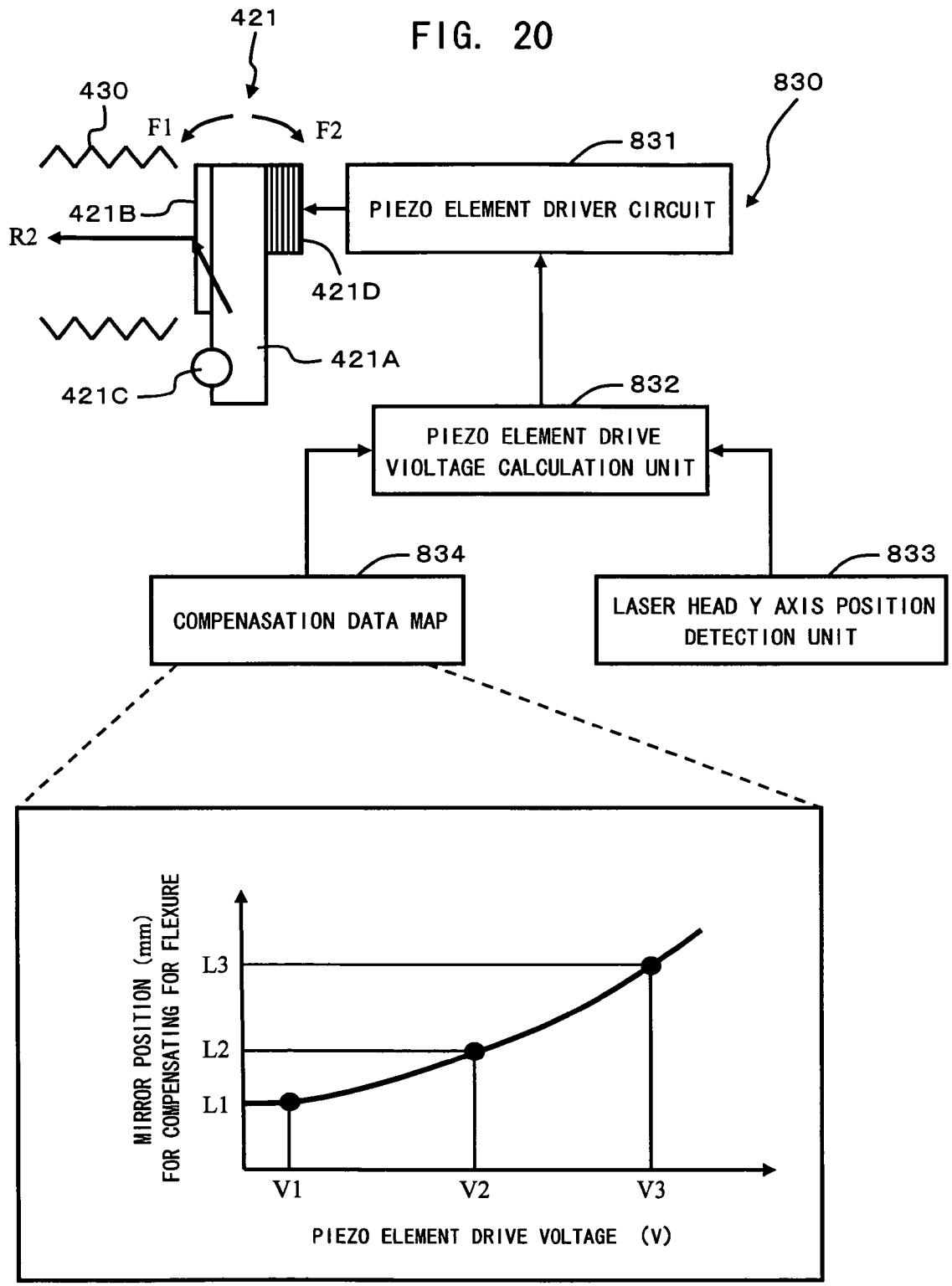
FIG. 20 is an explanatory figure showing a summary of a structure for adjusting the optical axis of the laser light beam supplied to the laser head, according to the position of the laser head.

FIG. 20 is an explanatory figure, schematically showing a mechanism for adjusting a mirror angle. This mechanism for adjusting the mirror angle, for example, may comprise a mirror angle adjustment device 830 and an emission mirror 421 of the optical system box 420.

First, the structure of a mirror 421 will be explained. This mirror 421 is provided in a laser beam emission portion of the optical system box 421, and may comprise, for example, a mirror supporter 421A, a mirror 421B, a fulcrum 421C, and a piezo element 421D. The mirror supporter 421A is capable of rotating to and fro through minute angles (only) around the fulcrum 421C as a rotational center, as shown by either of the arrows F1 and F2.

The mirror 421B is provided upon one surface of the mirror supporter 421A, and the piezo element 421D is provided upon the other surface of the mirror supporter 421A. The piezo element 421D changes the attitude of the mirror supporter 421A by extending and retracting according to a signal which is inputted from a piezo element driver circuit 831. When the piezo element 421D expands, the mirror supporter 421A rotates through just a minute angle about the fulcrum 421C as a centre, in the direction shown by the arrow F1. Due to this, the angle of the laser beam R2 which is emitted from the optical system box 420 changes downwards in the figure. By contrast, when the piezo element 421D shrinks, the mirror supporter 421A rotates through just a minute angle about the fulcrum 421C as a centre, in the direction shown by the arrow F2. Due to this, the angle of emission of the laser beam R2 changes upwards in the figure. It should be understood that the piezo element 421D is shown as one example; the present invention is not to be considered as being limited to this structure. Any element which is capable of minute displacement according to an external control signal could be employed.

The structure of the mirror angle adjustment device 830 will now be explained. This mirror angle adjustment device 830 may comprise a piezo element driver circuit 831, a piezo element drive voltage calculation unit 832, a laser head Y axis position detection unit 833, and a compensation data map 834. The laser head Y axis position detection unit 833 detects and outputs the Y axis position of the laser head 500. In the compensation data map 834, there are stored piezo element drive voltages for compensating the amount of flexure of the laser head which is generated in accordance with its Y axis position.

The piezo element drive voltage calculation unit 832 reads out the piezo element drive voltage which is appropriate for the current Y axis position of the laser head 500 by referring to the compensation data map 834, based upon the detection signal from the laser head Y axis position detection unit 833. And the calculation unit 832 inputs this voltage value which it has thus read out to the piezo element driver circuit 831. The piezo element driver circuit 831 inputs the voltage value which has been inputted to the piezo element 421D. Due to this, the piezo element 421D expands or shrinks in the left and right direction in the figure, and thereby the angle of the mirror 421B is minutely adjusted, and the emission angle of the laser beam R2 changes.

Figure 21:
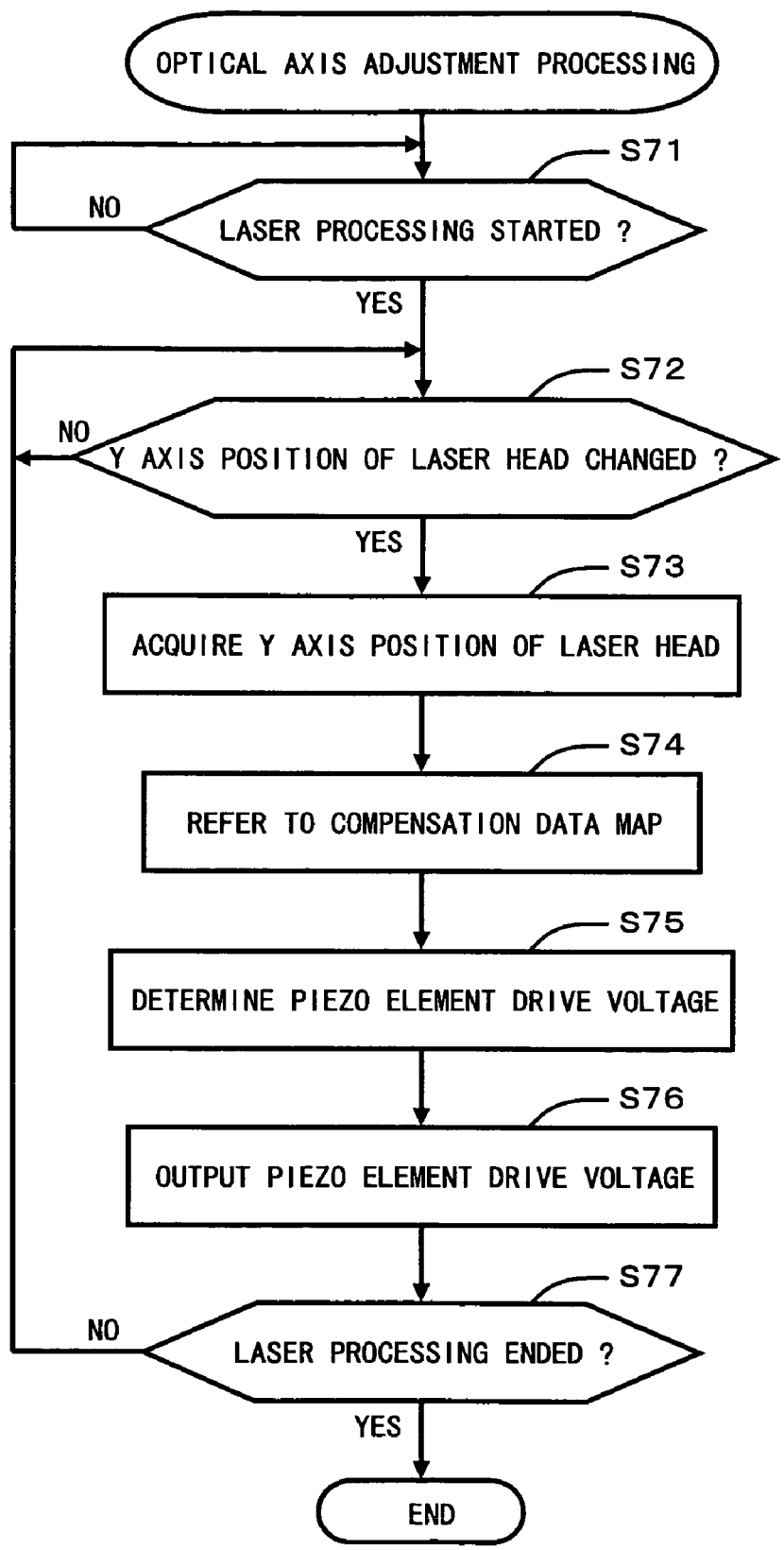
FIG. 21 is a flow chart showing a summary of processing for adjusting the optical axis.

FIG. 21 is a flow chart showing a summary of the processing for adjusting the optical axis. This processing may be performed either by the supervisory control device 700 or by the laser control device 810. Here, the example will be cited of the case in which it is executed by the supervisory control device 700, via the laser control device 810. When the laser processing is started (S71: YES), then monitoring is performed to check whether or not the Y axis position of the laser head 500 changes (S72).

Before the laser processing is started, the laser head 500 is parked in its parking region A3. When the laser processing is to be performed, the laser head 500 is shifted from its parking region A3 to the working space A1. When this shift is detected (S72: YES), the supervisory control device 700 detects the position of the laser head 500 (S73), and refers to the compensation data map 834 with this detected value (S74).

And the supervisory control device determines a value for the drive voltage according to the current Y axis position of the laser head 500 (S75), and applies this voltage to the piezo element 421D (S76). The steps S72 through S76 are repeated until the laser process ends (S77).

FIG. 22 is an explanatory figure, schematically showing the situation when adjusting the optical axis. FIG. 22(A) shows the case in which deviation of the position of the laser head 500 has not occurred, even though the Y axis position of the laser head 500 has changed. It is assumed that the initial position of the laser head is L1, its intermediate position is L2, and its maximum position is L3. The laser head 500 can be shifted freely along the Y axis direction within the range from L1 to L3. If no change has taken place in the position of the laser head 500 (i.e. in the position of the bending mirror 511) even though the laser head 500 has changed its Y axis position from L1 to L2 and from L2 to L3, then it is not necessary to perform adjustment of the optical axis. The laser beam R3 which has been reflected by the mirror 511 into the Z axis direction is irradiated accurately upon the target point.

FIG. 22(A) shows a case in which deviation of the position of the laser head 500 has occurred. As described above, in this embodiment, the laser head 500 and the plasma torch 600 are each supported by the arm 320 which traverses over the table 200 from its one side towards its other side. Furthermore, the parking region A2 for the plasma torch 600 is provided at the toe end portion P2 of the arm 320. Accordingly, when the laser head 500 shifts along the Y axis direction so as to be separated from the base end portion of the arm 320, the arm bends slightly due to the weight of the laser head 500. Due to this flexure, the position of the folding mirror 511 changes minutely. When the position of the folding mirror 511 deviates in this manner, as shown in FIG. 22(B), the irradiation point upon the plate material 210 towards which the laser beam R3 is emitted comes to change by $\Delta Y$.

Thus, in this embodiment, as shown in FIG. 22(C), in consideration of this flexure of the arm 320, the optical axis of the laser beam R2 which is emitted from the optical system box 420 is minutely adjusted by just an angle $\theta$ from a reference angle (the horizontal). In other words, even if positional deviation of the folding mirror 511 has taken place, the optical axis is minutely adjusted so that the laser beam R2$r$ comes to be incident upon the folding mirror, and so that the point of irradiation upon the plate material does not change. For this, piezo element drive voltage values are stored in advance in the compensation data map 834 shown in FIG. 20, in order to eliminate positional deviation of the folding mirror 511 in the Y axis positions L1 through L3 of the laser head 500. In concrete terms, for example, the optical axis is adjusted by taking when the laser head 500 is positioned at the base end portion (P1) of the arm 320 as being the reference position, and the compensation data map is created by actually measuring the positional deviations which are engendered by the Y axis position of the laser head 500 at predetermined intervals. It should be understood that it is possible to calculate the necessary drive voltage value when the head is positioned between one actually measure point and another, by interpolation calculation from the neighboring values.

Figure 23:
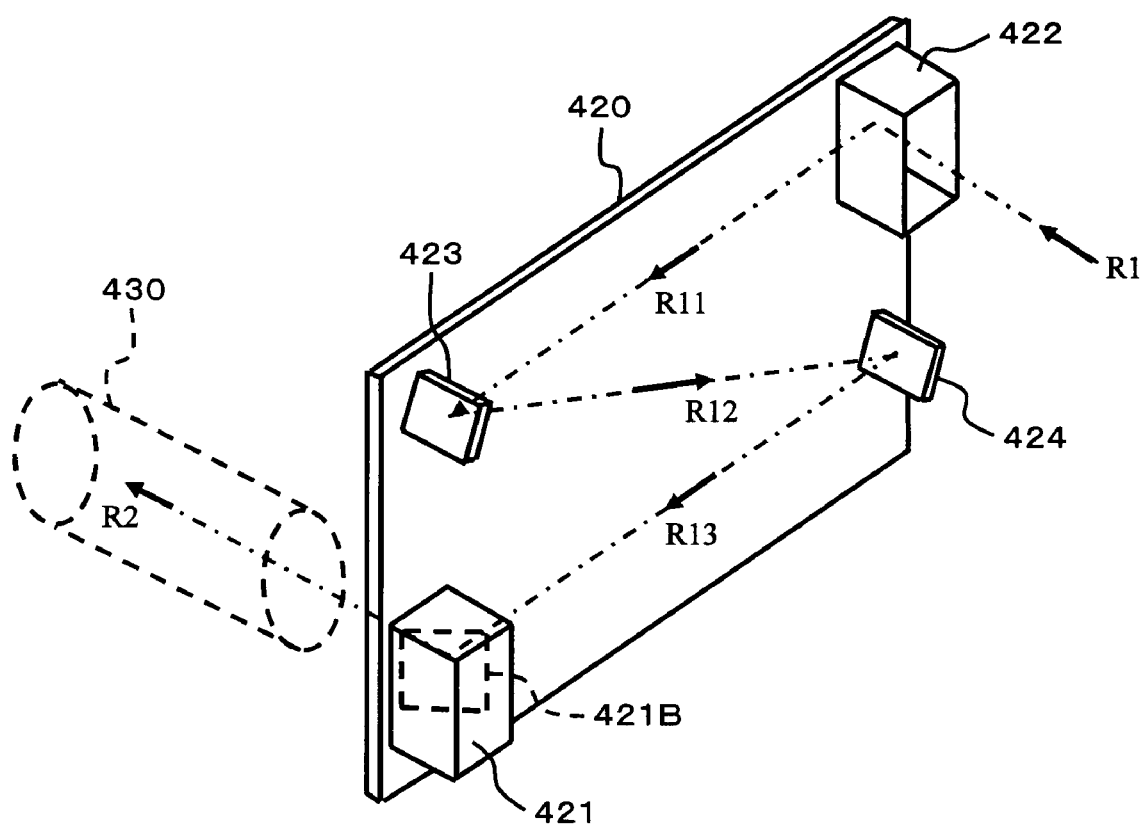
FIG. 23 is an explanatory figure schematically showing an optical system for inputting a laser light beam to the laser head.

An example of the optical system box 420 will now be explained based upon FIGS. 23 and 24. FIG. 23 is an explanatory figure schematically showing the interior of this optical system box 420. The laser beam R1 from the laser oscillation device 410 is incident upon an incident mirror 422 and is reflected thereby. The reflected laser beam R11 is again reflected by a subsequent mirror 423 to become the beam R12, which is further incident upon another mirror 424. The laser beam R13 which has been reflected by this mirror 424 is incident upon the emission mirror 421, and is folded into the Y axis direction. The laser beam R2 which has thus been folded is incident upon the folding mirror 511 of the laser head 500 via the guide barrel 430.

Figure 24:
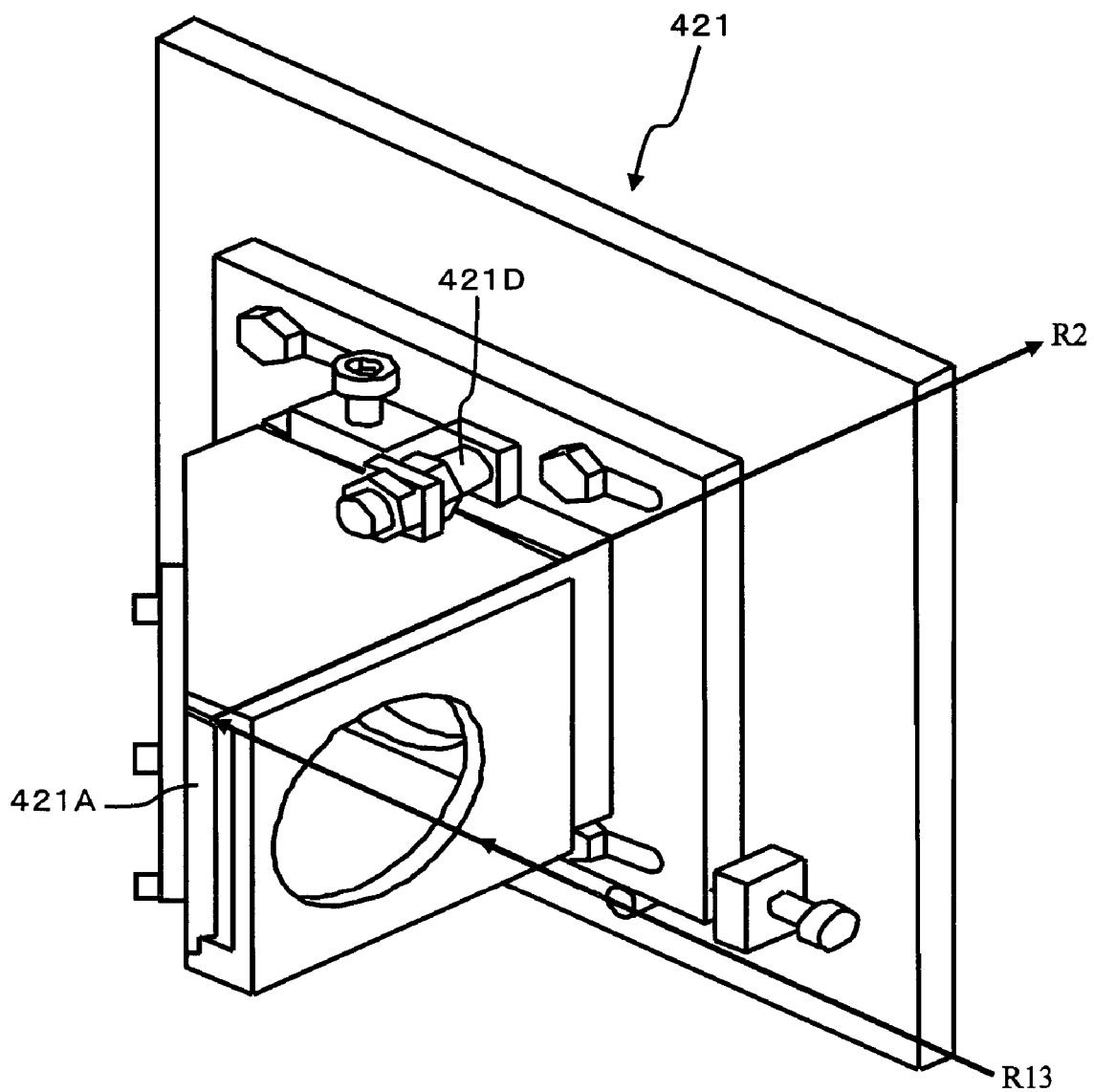
FIG. 24 is a perspective view showing a mechanism for adjusting the optical axis of the laser light beam.

FIG. 24 is a perspective view showing an example of the emission minor 451. The laser beam R13 which has been folded in the Y axis direction in this manner by the mirror 421 becomes the laser beam R2, and is emitted toward the laser head 500. The piezo element 421D minutely adjusts the optical axis of the laser beam R2 by changing the attitude of the mirror 421.

The same beneficial effects are manifested with this embodiment which is structured in this manner, as with the second embodiment. In addition, with this embodiment, it is possible to maintain the processing accuracy by suppressing deviation of the position for laser processing, since it is arranged to minutely adjust the optical axis of the laser beam R2 which is supplied to the laser head 500 according to the Y axis position of the laser head 500. In particular, with this embodiment, a so called cantilevered support method is employed, and moreover, during the laser processing, the plasma torch 600 is parked at the toe end portion of the arm 320. Accordingly, when the laser head 500 shifts to the vicinity of the toe end portion of the arm 320, there is a possibility that the arm 320 may bend slightly, due to the weights of the laser head 500 and the plasma torch 600. However, in this embodiment, since it is possible to adjust the optical axis of the laser beam in consideration of this flexure, accordingly it is possible to prevent any decrease in the processing accuracy. It should be understood that the present invention is not limited to performing this adjustment of the optical axis with the emission mirror 421; it would also be acceptable to arrange to perform this task at some other location, such as at the incident mirror 422 or the like.

Although the present invention has been explained above in terms of embodiments thereof, these embodiments have only been shown by way of example in order to explain the present invention; the range of the present invention is not limited only to these embodiments. Provided that the gist of the present invention is not departed from, it could be implemented in various other ways. For example, when cutting the cutting lines which have been classified according to the theory of the present invention as being of the plasma cutting type, it would also be acceptable to arranged for the piercing at the start position for the cutting to be performed by using the laser beam. Furthermore, in the embodiments described above, the processing program generation device classifies the cutting lines into the plasma cutting type and the laser cutting type, and creates the plasma processing program and the laser processing program. However, as a variant embodiment, it would also be acceptable to arrange for a processing program to be created by the processing program generation device at a stage at which, although the manufactured products are nested and the cutting lines have been defined, the above described classification has not yet been performed; and for this processing program to be received on the side of the hybrid thermal cutting device, and for that device to classify the cutting lines which are defined therein as being of the plasma cutting type or of the laser cutting type, and then to create the plasma processing program and the laser processing program.

The invention claimed is:

1. A hybrid thermal cutting apparatus comprising a plasma torch which generates a plasma arc and a laser head which generates a laser beam, comprising:
 a table for supporting a plate material;
 a shift mechanism which shifts said plasma torch and said laser head within a working space over said table; and
 a controller which controls said plasma torch, said laser head and said shift mechanism so that said plate material upon said table is cut along predetermined cutting lines;
 wherein said controller comprises:
 a supervisory control device having processing command information which defines said cutting lines, and which classifies said cutting lines into a plasma cutting type or a laser cutting type, according to processing conditions which include the geometric characteristics of said cutting lines, or processing accuracy, or characteristics of said plate material;
 a plasma control device which controls said plasma torch based upon said processing command information, and controls said plasma torch to perform cutting along said cutting lines classified as said plasma cutting type by the supervisory control device; and
 a laser control device which controls said laser head based upon said processing command information, and controls said laser head to perform cutting along said cutting lines classified as said laser cutting type by the supervisory control device.

2. The hybrid thermal cutting apparatus as described in claim 1, wherein said supervisory control device classifies said cutting lines into said plasma cutting type or said laser cutting type according to continuous length of said cutting lines.

3. The hybrid thermal cutting apparatus as described in claim 1, wherein said supervisory control device classifies said cutting lines into said plasma cutting type or said laser cutting type according to whether said cutting lines correspond to external peripheries of manufactured products, or to apertures.

4. The hybrid thermal cutting apparatus as described in claim 1, wherein said supervisory control device classifies said cutting lines into said plasma cutting type or said laser cutting type according to thickness of said plate material.

5. A hybrid thermal cutting apparatus comprising a plasma torch which generates a plasma arc and a laser head which generates a laser beam, comprising:
 a table for supporting a plate material;
 a shift mechanism which shifts said plasma torch and said laser head within a working space over said table; and
 a controller which controls said plasma torch, said laser head and said shift mechanism so that said plate material upon said table is cut along cutting lines;
 wherein:
 said shift mechanism comprises a plasma torch shift mechanism which shifts said plasma torch in at least a longitudinal direction of said table, and a laser head shift mechanism which shifts said laser head in at least a longitudinal direction of said table; and said controller comprises a plasma control device which independently controls said plasma torch shift mechanism, and a laser control device which independently controls said laser head shift mechanism, such that the plasma torch and the laser head may be shifted in the longitudinal direction of said table independently of each other.

6. The hybrid thermal cutting apparatus as described in claim 5, wherein each of said plasma torch shift mechanism and said laser head shift mechanism has a parking location which is positioned outside of said working space.

\* \* \* \* \*